United States Patent [19]
Lis

[11] Patent Number: 5,537,209
[45] Date of Patent: Jul. 16, 1996

[54] AN INTERFEROMETRIC MEASURING SYSTEM HAVING TEMPERATURE COMPENSATION AND IMPROVED OPTICAL CONFIGURATIONS

[75] Inventor: Steven A. Lis, Needham, Mass.

[73] Assignee: Sparta, Inc., Lexington, Mass.

[21] Appl. No.: 372,335

[22] Filed: Jan. 13, 1995

Related U.S. Application Data

[63] Continuation-in-part of Ser. No. 181,885, Jan. 14, 1994, Pat. No. 5,404,222.

[51] Int. Cl.[6] ............................ G01B 9/02; G01B 11/02
[52] U.S. Cl. ..................... 356/349; 356/351; 356/358
[58] Field of Search .................................. 356/349, 351, 356/358

[56] References Cited

U.S. PATENT DOCUMENTS

| | | |
|---|---|---|
| 3,458,259 | 7/1969 | Bagley et al. . |
| 3,656,853 | 4/1972 | Bagley et al. . |
| 3,788,746 | 1/1974 | Baldwin et al. . |
| 3,790,284 | 2/1974 | Baldwin . |
| 3,877,813 | 4/1975 | Hayes et al. . |
| 4,072,422 | 2/1978 | Tanaka et al. . |
| 4,215,938 | 8/1980 | Farrand et al. .................... 356/358 |
| 4,295,741 | 10/1981 | Palma et al. ....................... 356/349 |
| 4,465,372 | 8/1984 | Geary .................................. 356/359 |
| 4,594,003 | 6/1986 | Sommargren ..................... 356/349 |
| 4,632,554 | 12/1986 | Pearce ................................. 356/349 |
| 4,684,828 | 8/1987 | Sommargren ..................... 307/425 |
| 4,688,940 | 8/1987 | Sommargren et al. ............ 356/349 |
| 4,693,605 | 9/1987 | Sommargren ..................... 356/349 |
| 4,711,574 | 12/1987 | Baldwin ............................. 356/349 |
| 4,717,250 | 1/1988 | Sommargren ..................... 356/349 |
| 4,733,967 | 3/1988 | Sommargren ..................... 356/361 |
| 4,746,216 | 5/1988 | Sommargren ..................... 356/349 |

(List continued on next page.)

FOREIGN PATENT DOCUMENTS

| | | |
|---|---|---|
| 0359157A2 | 3/1988 | European Pat. Off. . |
| 0401799 | 12/1990 | European Pat. Off. . |
| 05126520 | 5/1993 | Japan ..................................... 356/345 |
| 2201256 | 8/1988 | United Kingdom ................... 356/345 |
| 2210973 | 6/1989 | United Kingdom . |

OTHER PUBLICATIONS

Lin, Yi–Jyh and Ci–Ling Pan, (1991) "Precision displacement measurement by active laser heterodyne interferometry" *Applied Optics* 30(13):1648–1652.

Ishida, Akira (1989) "Two–Wavelength Displacement–Measuring Interferometer Using Second–Harmonic Light to Eliminate Air–Turbulence–Induced Errors" *Japanese Journal of Applied Physics* 28(3):L473–475.

Dukes et al. (1970) "A Two–Hundred–Food Yardstick with Graduations Every Microinch", *Hewlett–Packard J.*, 21:203–209.

Johnson et al. (1977) "Phase–Locked Interferometry", *Clever Optics, SPIE Proc.*, 126:152–160.

Hopf et al. (1980) "Second–harmonic interferometers", *Optics Letters*, 5:487–489.

(List continued on next page.)

*Primary Examiner*—Frank Gonzalez
*Assistant Examiner*—Jason D. Eisenberg
*Attorney, Agent, or Firm*—Thomas J. Engellenner; John V. Bianco; Lahive & Cockfield

[57] ABSTRACT

An improved interferometric measuring system wherein the system projects a first beam of light at a first measurement wavelength along a reference path to a reference reflector and a second beam of light at a second measurement wavelength along a measurement path to a measurement reflector, and determines a change in position of the measurement reflector from an interference pattern produced between a first light beam reflected from the reference reflector and a second light beam reflected from the measurement reflector, and wherein the system can measure atmospheric disturbances along the measurement path, concurrently with measuring a change in the position of the measurement reflector.

41 Claims, 16 Drawing Sheets

U.S. PATENT DOCUMENTS

| | | | |
|---|---|---|---|
| 4,752,133 | 6/1988 | Sommargren | 356/349 |
| 4,784,489 | 11/1988 | Cutler et al. | 356/349 |
| 4,784,490 | 11/1988 | Wayne | 356/351 |
| 4,787,747 | 11/1988 | Sommargren et al. | 356/349 |
| 4,802,764 | 2/1989 | Young et al. | 356/349 |
| 4,802,765 | 2/1989 | Young et al. | 356/349 |
| 4,807,997 | 2/1989 | Sommargren | 356/349 |
| 4,832,489 | 5/1989 | Wyant et al. | 356/359 |
| 4,859,066 | 8/1989 | Sommargren | 356/349 |
| 4,881,815 | 11/1989 | Sommargren | 356/349 |
| 4,881,816 | 11/1989 | Zanoni | 356/349 |
| 4,883,357 | 11/1989 | Zanoni et al. | 356/349 |
| 4,886,363 | 12/1989 | Jungquist | 356/349 |
| 4,906,095 | 3/1990 | Johnston | 356/349 |
| 4,907,886 | 3/1990 | Dandliker | 356/349 |
| 4,930,894 | 6/1990 | Baldwin | 356/351 |
| 4,950,078 | 8/1990 | Sommargren | 356/349 |
| 4,969,017 | 11/1990 | Lefevre et al. | 356/350 |
| 5,004,914 | 4/1991 | Vali et al. | 298/227.27 |
| 5,127,735 | 7/1992 | Pitt | 356/358 |
| 5,133,599 | 7/1992 | Sommargren | 356/349 |
| 5,146,284 | 9/1992 | Tabarelli et al. | 356/345 |
| 5,153,669 | 10/1992 | DeGroot | 356/349 |
| 5,172,185 | 12/1992 | Leuchs et al. | 356/358 |
| 5,172,186 | 12/1992 | Hosoe | 356/358 |
| 5,187,543 | 2/1993 | Ebert | 356/349 |

OTHER PUBLICATIONS

Baldwin et al. (Apr. 1983) "Laser Optical Components for Machine Tool and Other Calibrations", *Hewlett–Packard J.*, pp. 14–22.

Quenelle et al. (Apr. 1983) "A New Microcomputer–Controlled Laser Dimensional Measurement and Analysis System", *Hewlett–Packard J.*, pp. 3–13.

Siddall et al. (1987), Marinus Nijhoff publication *Optical Metrology (Coherent and Incoherent Optics for Metrology, Sensing and Control in Science, Industry and Biomedicine)* "Some Recent Developments in Laser Interferometry" (Olivério D. D. Soares, Porto, Portugal, eds.), published in cooperation with NATO Scientific Affairs Div., pp. 69–83.

1

AN INTERFEROMETRIC MEASURING SYSTEM HAVING TEMPERATURE COMPENSATION AND IMPROVED OPTICAL CONFIGURATIONS

REFERENCE TO RELATED PATENTS

This application is a continuation-in-part of U.S. patent application Ser. No. 08/181,885, now U.S. Pat. No. 5,404,222 entitled "An Interferometric Measuring System With Air Turbulence Compensation" filed Jan. 14, 1994, and assigned to the assignee of the present application. This application is also related to U.S. patent application Ser. No. 08/372,226, filed on Jan. 13, 1995.

BACKGROUND OF THE INVENTION

This invention relates generally to interferometers. More particularly, it relates to methods and apparatus for improving the accuracy of interferometric measurements.

Interferometers typically measure the change in position of a movable measurement mirror with respect to a second stationary reference mirror. To perform this measurement, a light source generates a beam of light, part of which is reflected from the reference mirror and part of which is reflected from the measurement mirror. The light reflected from the two mirrors is then combined. If one mirror moves relative to the other mirror, the intensity of the combined beam periodically increases and decreases as the reflected light from the two paths alternately interferes constructively and destructively. This constructive and destructive interference is caused by the two beams moving in and out of phase. Each half wavelength of mirror movement results in a total optical path change of one wavelength and thus, in one complete cycle of intensity change. The number of cycle changes indicates the number of wavelengths that the mirror has moved. Therefore, by counting the number of times the intensity of the light cycles between darkest and lightest, the change in position of the moving mirror can be estimated as an integral number of wavelengths.

Alternatively, the interferometer can employ a heterodyne laser source. As used herein, the term "heterodyne laser" refers to a laser that produces at least two beams of light closely spaced in frequency (e.g., having a frequency difference or beat frequency in the approximate range of 1–20 MHz.), and being orthogonally polarized. A polarization sensitive beamsplitter directs one of the beams along the measurement path to the measurement mirror and one of the beams along the reference path to the reference mirror. A heterodyne sensor combines the light reflected from the two mirrors and detects the beat frequency. As long as the measurement mirror remains stationary, the beat frequency remains fixed. However, if the measurement mirror moves, a predictable change in the beat frequency will result due to the Doppler effect. Changes in the number of frequency beats are directly related to the changes in position of the measurement reflector. Thus, the heterodyne interferometer can accurately measure a change in the measurement mirror's position relative to the reference mirror.

Over the last decade or so, interferometers have played an important role in integrated circuit fabrication. A principal tool used for mass production of integrated circuit chips is a lithographic stepper. During integrated circuit fabrication, a substrate is affixed to a movable stage. The lithographic stepper is the device which positions the stage underneath a high performance image projection system. Interferometers are used to sense the stage position and to control the stepper. Consequently, as manufacturers attempt to reduce the dimensions of the circuits being formed on substrates, and as registration tolerances are tightened, interferometers are required to provide more precise control for the stepper.

The precision with which interferometers can provide such position control has been significantly enhanced by technical advances in the design of various optical components, including lasers, and photosensors. However, the performance of interferometers is, nevertheless, limited by changes in optical path length due to atmospheric disturbances in the measurement and reference paths. Such atmospheric disturbances can be easily controlled with regard to the reference path by enclosing the portion of the interferometer which includes the reference mirror in a vacuum chamber. However, enclosing the entire system, including the movable measurement mirror, which is typically mounted on the stage assembly, in a vacuum chamber can be very expensive.

To solve this problem, prior art systems attempted to compensate for fluctuations in optical path length by using sensors which detect atmospheric fluctuations. However, such approaches have enjoyed only limited success because the sensors utilized can not be located directly in the measurement beam path, without affecting the quality of the principal measurement.

Accordingly, one object of the invention is to provide an improved interferometer having the capability of directly measuring changes in the optical path length resulting from atmospheric disturbances.

Another object of the present invention is to provide an improved interferometer that compensates for measurement errors resulting from temporally dependent atmospheric fluctuations along the optical beam path.

A further object of the invention is to provide an improved interferometer having the capability of directly measuring changes in optical path length resulting from atmospheric disturbances, concurrently with measuring a change in position of a movable measurement mirror with respect to a stationary reference mirror.

Other general and specific objects of the invention will in part be obvious and will in part appear hereinafter.

SUMMARY OF THE INVENTION

The foregoing objects are attained by the invention, which provides an improved interferometric measuring system for determining a change in position of a measurement reflector with respect to a reference reflector. According to a preferred embodiment, the system comprises a first laser source including optical elements for projecting a reference beam of light along a reference path to the reference reflector. The first laser source also includes optical elements for projecting a measuring beam of light along a measurement path to a measurement reflector. The system determines a first measurement of changes in the position of the measurement reflector with respect to the reference reflector from an interference pattern produced between a first light beam reflected from the reference reflector and second light beam reflected from the measurement reflector. The laser source can employ either a single frequency or heterodyne type laser.

According to one embodiment of the invention, the system further comprises a second laser source, a sensor, and an error compensation network. The second laser source projects a first detection beam at a first detection wavelength and a second detection beam at a second detection wavelength along the measurement path. The sensor measures a phase difference between a first reflected detection beam from the measurement reflector due to the first detection beam and a second reflected detection beam from the measurement reflector due to the second detection beam. The difference in the phase angle between the two reflected beams is representative of the atmospheric disturbances along the measurement path. The error compensation network compensates for any errors in the interferometric measurements, which result from the detected atmospheric disturbances.

As stated above, the first laser source, which includes optical elements for projecting the reference and measurement beams can include a heterodyne laser source. Thus, the reference beam and the measurement beam can be linearly polarized and orthogonal to each other. Additionally, the reference beam and the measurement beam can be closely spaced in frequency. In a further embodiment, the interferometric system determines the change in position of the measurement reflector by determining a difference in the frequency between the first reflected light beam and the second reflected light beam.

The second laser source can also include a diode laser, other solid state lasers or gas lasers for generating the detection beams. According to a preferred embodiment, the wavelength of the first detection beam is substantially different from both the wavelength of the measurement beam and the wavelength of the reference beam. The second laser source can also include a first wavelength shifter for shifting the wavelength of the first detection beam to generate the second detection beam. According to a further embodiment, the wavelength shifter halves the wavelength of the first detection beam to generate the second detection beam.

In a preferred practice of the invention the system includes optical networks for projecting any or all of the measurement beam, reference beam and detection beams along the respective paths a plurality of times.

The sensor for measuring phase difference can include a beamsplitter, a second wavelength shifter, and a photosensitive detector. The beamsplitter directs the first reflected detection beam along a first optical path to the second wavelength shifter. The beam director directs the second reflected detection beam along a second optical path to the photosensitive detector. The second wavelength shifter shifts the first detection wavelength to be substantially equal to the second detection wavelength. The photosensitive detector determines a difference in phase angle between the first reflected beam and the second reflected beam, subsequent to the first reflected beam being frequency shifted.

According to a further embodiment of the invention, a number of the components, which comprise the sensor, are configured to be temperature compensated. The temperature compensation can be realized by constructing beamsplitters from calcite and by mounting the components on an aluminum plate. In this way, the thermal expansion coefficient of aluminum can be balanced against the temperature coefficients of the refractive index of calcite to render the sensor relatively insensitive to uniform temperature changes.

According to other embodiments of the invention, a variety of means and methods can be employed to improve an interferometric measuring system to measure atmospheric disturbances along both the reference and the measurement paths. By way of example, according to one embodiment, the interferometric system can project a first detection beam along the reference path and a second detection beam along the measurement path. The system can include a sensor for determining a second measurement of the change in position of the measurement reflector with respect to the reference reflector from the interference pattern produced between a light reflected from the reference reflector due to the first detection beam and light reflected from the measurement reflector due to the second detection beam. The system can also include a data processor for determining an error due to atmospheric disturbances by comparing the first measurement with the second measurement.

In this way, the invention provides an improved interferometric measuring system, which can detect errors resulting from atmospheric disturbances.

BRIEF DESCRIPTION OF THE DRAWINGS

For a better understanding of the nature and objects of the invention, reference should be made to the following detailed description and the accompanying drawings, in which.

DETAILED DESCRIPTION

Figure 1:
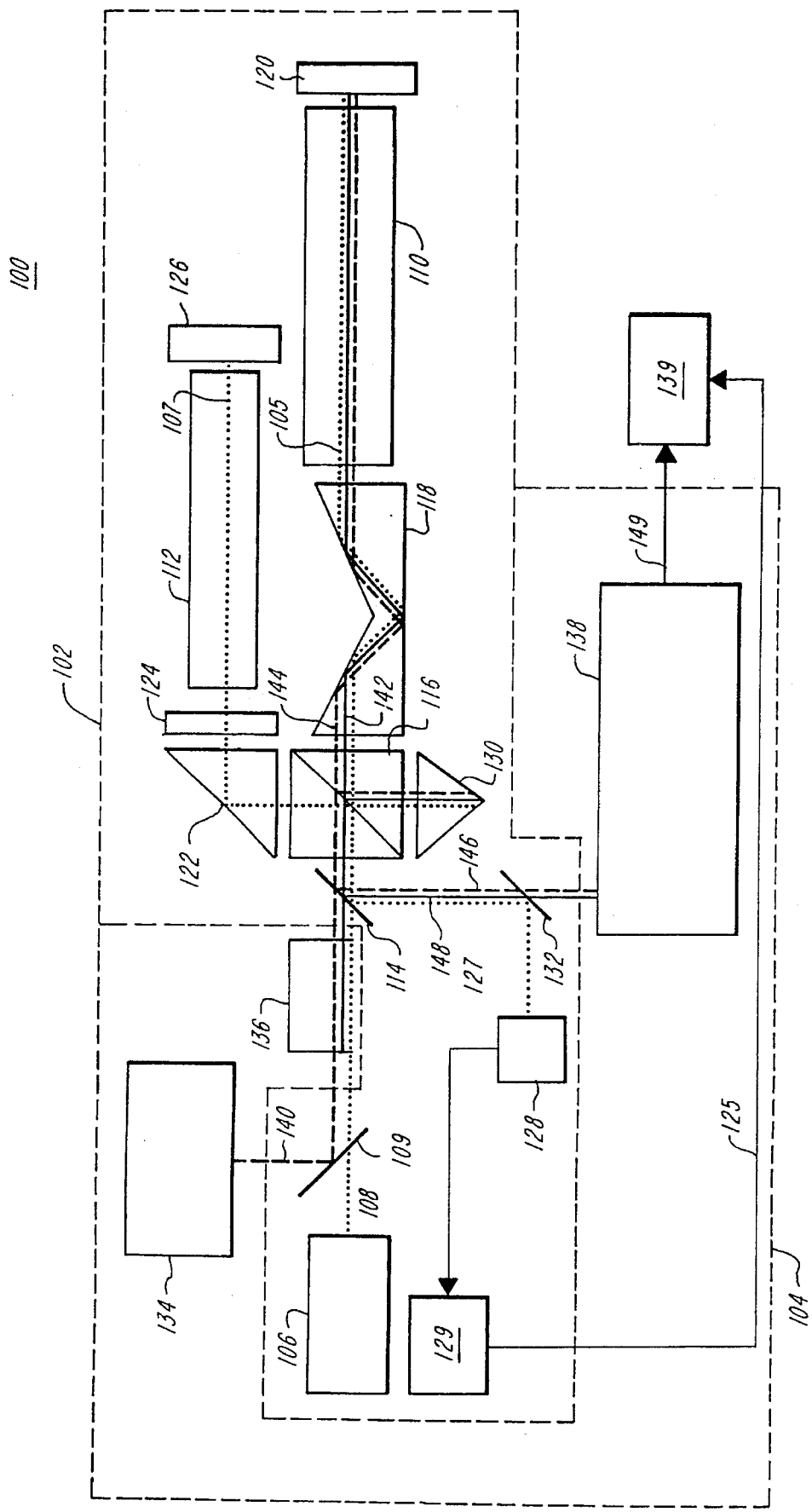
FIG. 1 is a schematic block diagram depicting an interferometric measurement system incorporating an air turbulence compensated network, which utilizes a second harmonic interferometric sensor.

FIG. 1 shows a schematic block diagram of an interferometric measurement system 100 incorporating an air turbulence compensation network 104, according to one embodiment of the present invention. The interferometer 100 can be, for example, a heterodyne or a single frequency interferometer. As FIG. 1 illustrates, the interferometer 100 is functionally divided into a measurement network 102 and a compensation network 104. The measurement network 102 measures changes in the position of the measurement mirror 120 relative to the fixed position of the reference mirror 126. The compensation network 104 detects changes in the length of the optical measurement path 110 which result from atmospheric disturbances along that path. According to one preferred embodiment, the position information from sensor 128 and the compensation information from sensor 138 are coupled to, for example, a lithographic stepper position controller to enhance the performance of the controller 139.

The measurement network 102 includes a laser source 106, along with the necessary optical elements to project a measurement beam along a measurement path 110, and to project a reference beam along a reference path 112. According to one preferred embodiment, the laser source 106 is a heterodyne laser. According to another embodiment, the laser source 106 is a single frequency laser.

Figure 12:
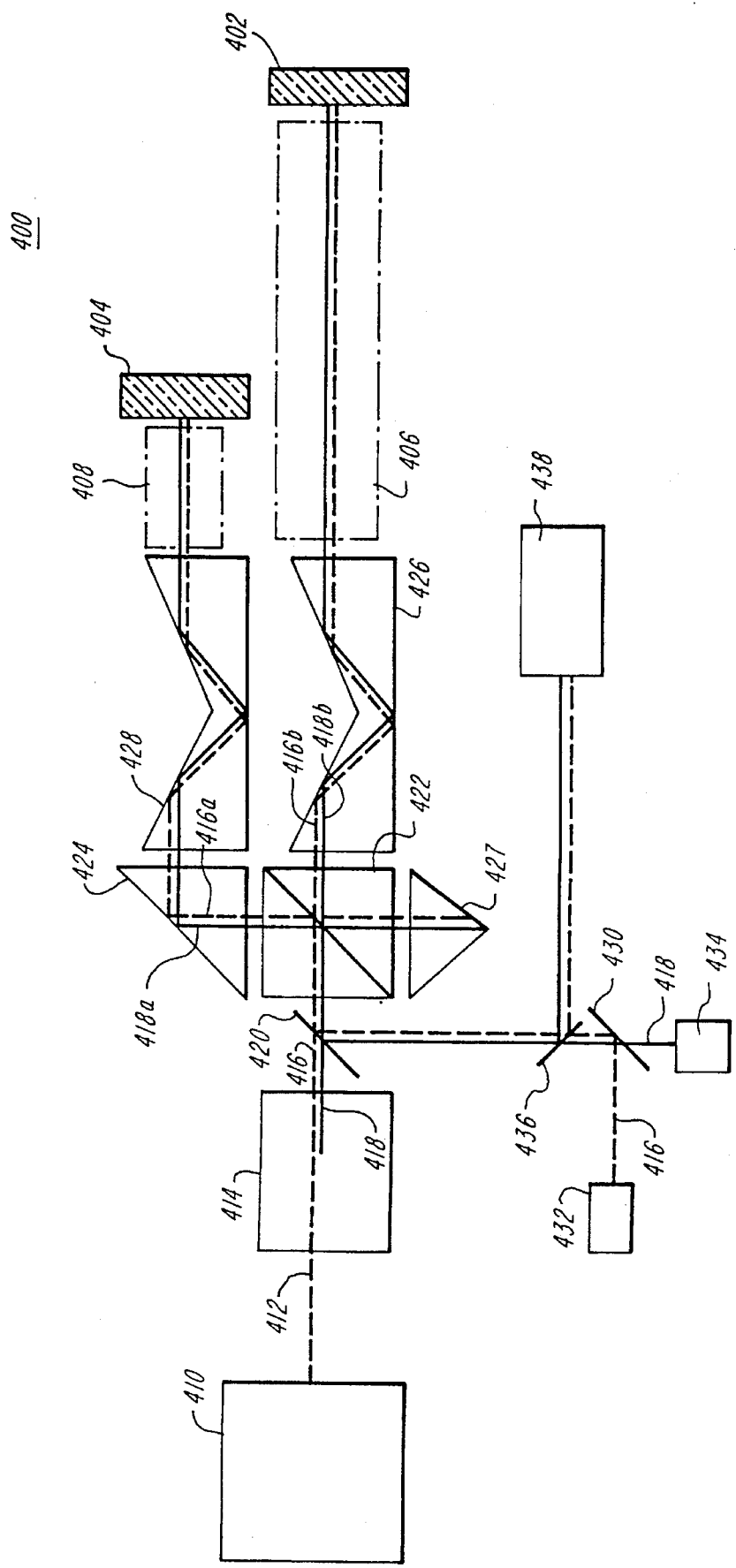
FIG. 12 is a schematic block diagram depicting an interferometric measurement system incorporating an air turbulence compensation network, which utilizes a single heterodyne laser source.

In the case of laser 106 being a heterodyne laser, during operation, it projects the measurement beam 105 having a wavelength $\lambda_1$ (and correspondingly a frequency $f_1$) and the reference beam 107 having a wavelength $\lambda_2$ (and correspondingly a frequency $f_2$), past the mirror 114 to the polarization sensitive beamsplitter 116. The beamsplitter 116, being sensitive to the relative orthogonal polarization of the two beams projected from the laser 106 (i.e., whether the respective beam is S-polarized or P-polarized), directs the measurement beam 105 through the quarter wavelength rhomb 118 and along the measurement path 110 to the variable position measurement mirror 120. Similarly, the beamsplitter 116 directs the reference beam 107 through the quarter wavelength plate 124 and along the reference beam path 112 to the fixed position reference mirror 126. According to the depicted embodiment, the heterodyne laser 106 initially polarizes the measurement beam 105 to be P-polarized. Similarly, the reference beam 107 is initially S-polarized. However in alternate configurations, alternate polarizations can be employed. The reference mirror 126 and the measurement mirror 120 reflect the reference beam 107 and the measurement beam 105, respectively, back to a heterodyne sensor 128. The sensor 128 combines the reflected measurement beam 105 and the reflected reference beam 107 and generates an electrical signal 127 representative of the beat frequency between the two beams. The processor 129 corresponds changes in the beat frequency to changes in the position of mirror 120 and generates a signal 125, indicative thereof. The signal 125 can be either digital or analog in nature and can be used, for example, as an input to a controller 139 for positioning a lithographic stepper stage, as shown in FIG. 12. With the mirrors 126 and 120 exactly aligned, the beat frequency between the reflected measurement beam 105 and the reflected reference beam 107 (i.e., the difference in frequency between reflected beams 105 and 107) is exactly equal to the beat frequency of the heterodyne laser 106. However, as is well known, due to Doppler shifting, the beat frequency changes in response to the movement of the measurement mirror 120. Thus, the network 102 can provide an accurate measurement of the changes in position of the measurement mirror 120, relative to the reference mirror 126. To further enhance the accuracy of the network 102, a second heterodyne sensor (not shown) can be included to measure the beat frequency between beams 105 and 107, prior to those beams being coupled to beamsplitter 116. This beat frequency measurement is used as a reference point to correct for any frequency fluctuations in the heterodyne laser 106.

In the case where laser 106 is of the single frequency variety, the system 100 operates in essentially the same fashion. However, sensor 128 is replaced with a nonheterodyne sensor. More specifically, the light reflected from mirrors 126 and 120 recombines at sensor 128, which generates a dc signal 127 that varies in response to the light reflected from mirrors 126 and 120 interfering alternately, constructively and destructively, as mirror 120 moves. The processor 129 monitors the generated signal 127 to count fringe patterns to determine a change in the position of mirror 120. Optionally, beam 108 can be polarized. In that case, the plane of polarization should be oriented at 45 degrees, relative to the beamsplitter 116, to cause one half of the beam 108 to be reflected along path 112, and one half to be reflected along path 110.

The effects of the Doppler shift, mentioned above, can be amplified by repeatedly reflecting the measurement beam 105 along the measurement path 110 and/or by repeatedly reflecting the reference beam 107 along the reference path 112. To provide this feature, the measurement network 102 includes the corner cube 130. As discussed below with respect to FIG. 8, alternate configurations can also be employed to achieve such repeated reflection.

Figure 2:
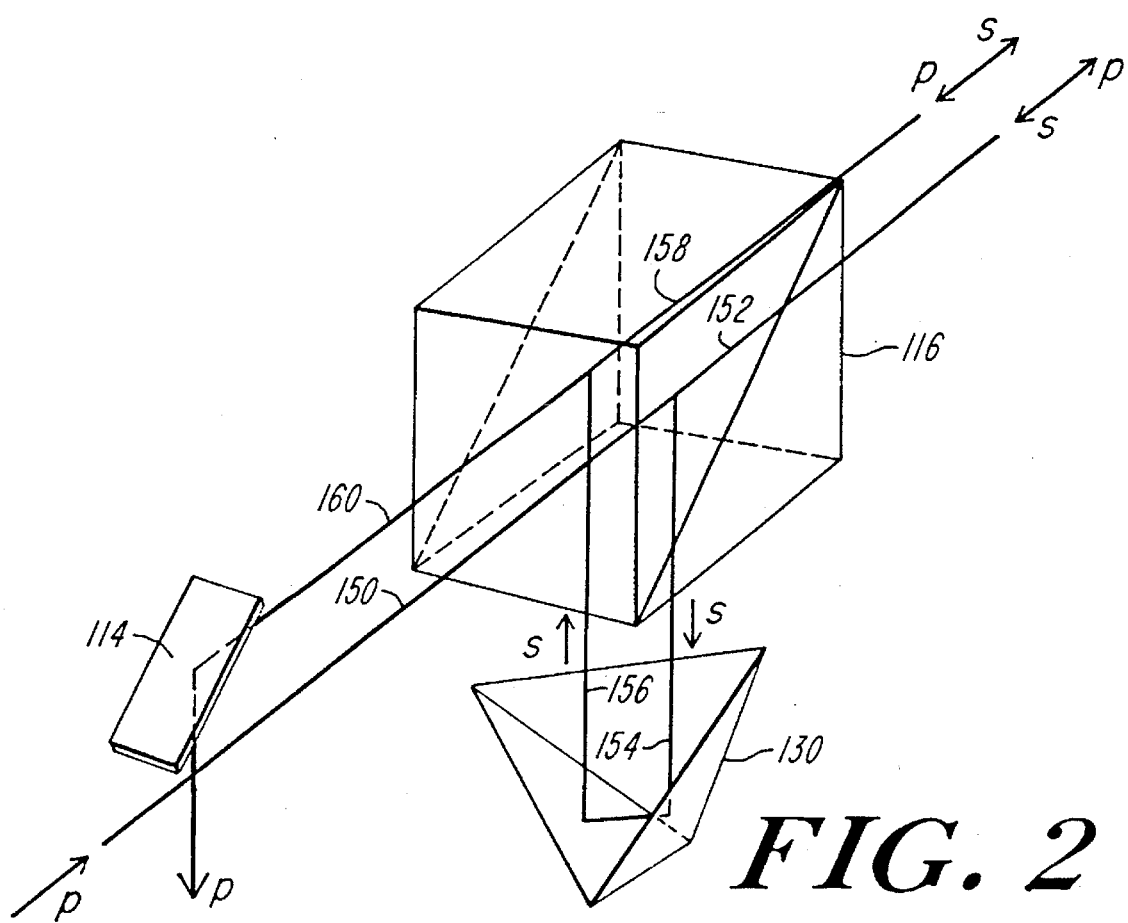
FIG. 2 is a perspective view showing a corner cube and a polarization sensitive beamsplitter of the type depicted in FIG. 1.

FIG. 2 shows a perspective view of the comer cube 130 and the polarization sensitive beamsplitter 116, operating in combination to enable the measurement beam 105 to traverse the measurement path multiple times, prior to being combined with the reflected reference beam 107. The P and S notations in FIG. 2 indicate the polarization of the measurement beam 105 along the various optical paths shown. Initially, the collinear S and P beams pass by the mirror 114 on their way to the polarization sensitive beamsplitter 116 along path 150. The beamsplitter 116 directs the P-polarized measurement beam 105 to the measurement mirror 120 along path 152 through the quarter wavelength rhomb 118. As the beam 105 passes through the rhomb 118, the rhomb 118 rotates the beam 105 to have circular polarization. The measurement mirror 120 then reflects the beam 105 along path 152 back through the rhomb 118. After reflection by polarization beamsplitter (116) the beam travels along path 154, is reflected by retroreflector 130 and returns along path 156 to be reflected again by beamsplitter 116 to travel path 158. Next, the rhomb 118 rotates the beam 105 to have circular polarization. The measurement mirror 120 again reflects the beam 105 along path 158 through the rhomb 118, giving it p-polarization so that it now passes through beamsplitter 116. Thus, each time the beam 105 passes from the beamsplitter 116 to the mirror 120 and back, the rhomb 118 and the mirror 120 operate to rotate its polarization.

In response to the beam 105 being P-polarized, the beamsplitter 116 couples the measurement beam 105 back to the mirror 114 along path 160. In this way, the illustrated measurement beam 105 traverses the measurement path two times, prior to being combined with the reflected reference beam 107.

Heterodyne interferometric measurement networks of the type depicted in FIG. 1 at 102 are well known in the art. For a fuller discussion of such networks, reference should be made to U.S. Pat. No. 3,790,284 and U.S. Pat. No. 4,883,357, the teachings of which are incorporated herein by reference.

The optical components included in the network 102 can be selected to provide high performance at the wavelengths of the heterodyne beam 108 and concurrently at the wavelengths of the detection beams 142 and 144. By way of example, transmissive materials can be employed, which permit efficient transmission at all the wavelengths in question. Additionally, the quarter wavelength plate 124 and the quarter wavelength rhomb 118 should provide accurate phase delay at all the wavelengths used, although the accuracy of the phase delay need not be the same at all the wavelengths. To accomplish this, beamsplitters made of calcite, which provide accurate separation of light beams over a wide range of wavelengths due to their polarization properties, are employed. Similarly, quarter wavelength rhombs provide achromatic wave retardation, and specially designed quarter wavelength plates, which are also achromatic in nature are used.

The components utilized in the measurement network 102 are well known in the art. By way of example, the heterodyne laser 106 is a model #5517B laser head, and the heterodyne sensor 128 is a model #10780F receiver, both available from Hewlett-Packard Company. The beamsplitter 116 is a model #MGTYB20 UV Polarizer, available from Karl Lambrecht Company. The reflectors 122 and 130 are a model #01 PQA 002 Right Angle Prism; and a model #CCH 007 retroreflector, respectively; both available from Melles Griot Company. The quarter wavelength plate 124 is a model #WPQC4-12-V, also available from Karl Lambrecht. The quarter wavelength rhomb 118 is a custom designed quarter wavelength plate of the type shown schematically in FIG. 3, also available from Karl Lambrecht Company. The phase retardation versus wavelength characteristic of rhomb 118 is plotted in FIG. 4.

Typically, in the measurement network 102, the reference beam path 112 is environmentally controlled, for example, by enclosing that path in a vacuum chamber. However, as previously discussed, the measurement path 110 can not be as easily controlled, and thus, the time varying dispersive properties of the measurement path 110 introduces a source of error into the interferometer 100. To account for and minimize the errors caused by the time varying dispersive nature of the medium along the measurement path 110, the interferometer 100 includes the compensation network 104.

It is well known that the time varying dispersive properties of a beam path are due to a change in the refractive index n along the path. It is also well known that the refractive index of a medium varies in a predictable manner in dependence on the wavelength λ of the beam propagating through the medium. The change in refractive index with wavelength for air can be expressed by the Cauchy relationship (i.e., the index of refraction of air versus the wavelength of light).

Figure 5:
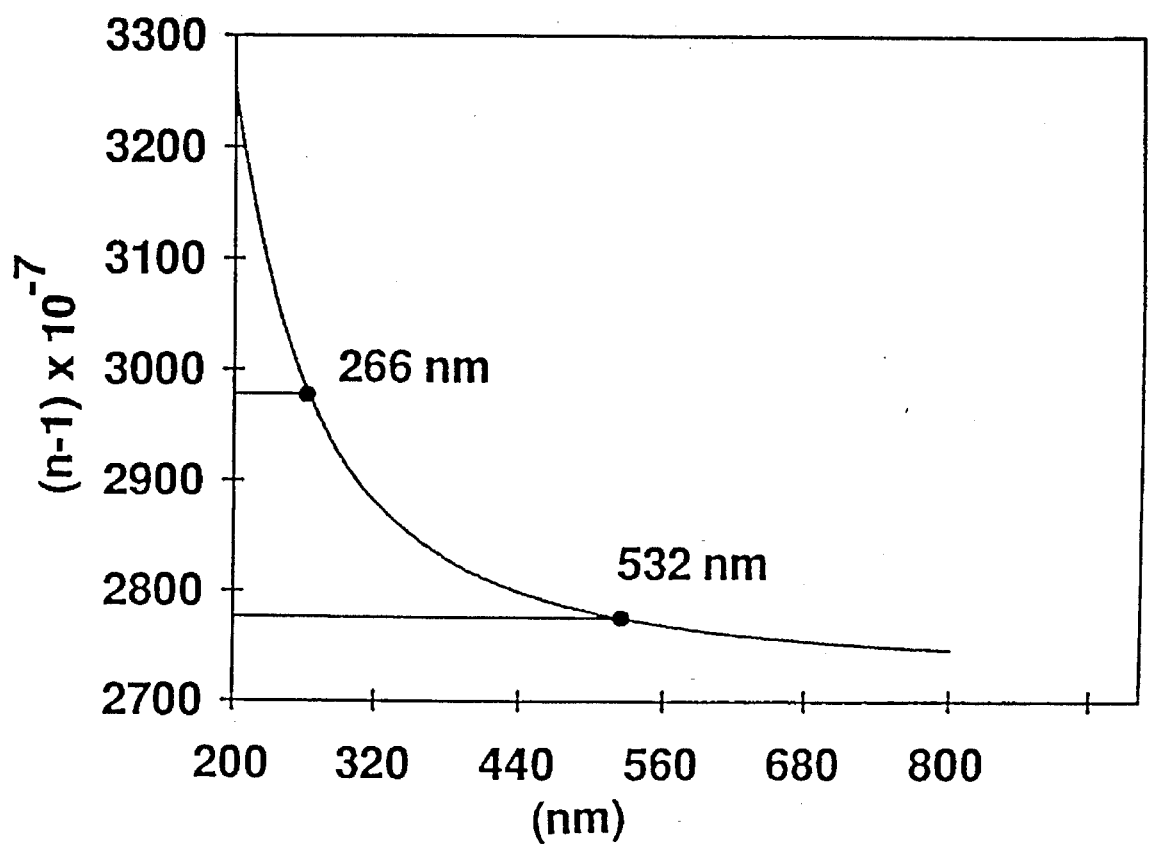
FIG. 5 is a graph depicting the relationship between the wavelength of light and the index of refraction of air.

FIG. 5 graphically illustrates the Cauchy relationship for air. As shown in FIG. 5, for a light beam having a wavelength of 266 nm, the index of refraction of air is approximately $1.0+2971\times10^{-7}$. In the same way, for a light beam having a wavelength of 532 nm, the index of refraction of air is approximately $1.0+2774\times10^{-7}$. Because the path length l, varies proportionally with n which in turn changes with λ, as explained above, l will vary with λ according to:

$$l(\lambda,\rho)=l_0+[n(\lambda,\rho)-1]l_0$$

where $l_0$ is the path length measured in a vacuum, λ is the wavelength, n is the index of refraction of air, and ρ is the air density. Thus, over a 20 cm path in air, the approximate difference of $2.0\times10^{-5}$ in the refractive index of air, seen by a beam having a wavelength of 266 nm and a beam having a wavelength of 532 nm, creates a path length difference of 4 μm.

Additionally, small air turbulences, due to thermal non-uniformities in the local environment and due to air flow irregularities, can alter the local density of air ρ. As FIG. 5 illustrates, for a beam having a wavelength of 532 nm, a 0.1% change in ρ results in a fluctuation in the refractive index of air of approximately $2.8\times10^{-7}$. Thus, over a 20 cm path for a single wavelength measurement, the fluctuation would be approximately $\Delta nl_0=56$ nm. As shown in FIG. 5, there is approximately a $2.0\times10^{-5}$ difference in the refractive index of air seen by a beam having a wavelength of 266 nm versus a beam having a wavelength of 532 nm. Thus, over a 20 cm turbulent path in air, density fluctuations of 0.1% can create an additional path length difference of 4 nm between a beam having a wavelength of 266 nm and a beam having a wavelength of 532 nm. Since the relationship between refractive index and wavelength is known, if both laser beams traverse the same optical path, one can factor out the changes in optical path length due to atmospheric disturbances. This permits a direct and rapid measurement of the change in the optical path length resulting from the atmospheric effects. According to the invention, network 104 exploits the Cauchy relationship to measure the effects of any atmospheric disturbance along path 110, concurrently with network 102 measuring changes in the position of mirror 120. The compensation network 104 includes a laser source 134 (e.g., a diode pumped double YAG laser), a frequency doubler 136, and a sensor 138. The output 149 from the sensor 138 can be coupled to a controller 139, such as that for a stage drive motor, as shown at 724 in FIG. 10.

During operation, the laser source 134 provides a single polarized laser beam 140, which is separated in wavelength from the heterodyne beam 108. The beamsplitter 109 reflects the beam 140 to the frequency doubler 136. The frequency doubler 136, constructed from a nonlinear optical material such as potassium dihydrogen phosphate or ammonium dihydrogen phosphate, doubles the frequency of the beam 140, and passes both the doubled detection beam 142, having a wavelength of 266 nm (UV), and the undoubled detection beam 144, having a wavelength of 532 nm (green), to the polarization sensitive beamsplitter 116 past the mirror 114. For increased accuracy, the heterodyne laser beam 108 can pass through the frequency doubler 136 along with the laser beam 140.

The beamsplitter 116 couples both detection beams, 142 and 144, to the variable position measurement mirror 120 by way of the quarter wavelength rhomb 118 and the measurement beam path 110. As in the case of the measurement beam 105, the corner cube reflector 130 operates in combination with the beamsplitter 116 to cause beams 142 and 144 to be reflected multiple times between the beamsplitter 116 and the mirror 120. Following a predetermined number of passes along the measurement path 110, the beamsplitter 116 couples the reflected detection beams 146 and 148 to the sensor 138 by way of the mirrors 114 and 132.

According to one preferred embodiment, the sensor 138 is a second harmonic interferometric sensor. The sensor 138 determines the effects of atmospheric disturbances along path 110 by measuring the phase difference between the reflected detection beams 146 and 148. In a vacuum, since beams 146 and 148 travel along identical optical paths, once the frequency of beam 146 is doubled to match the frequency of beam 148, these two signals should be in phase. However, as predicted by the Cauchy Relationship, signals of differing wavelengths exhibit different dispersion characteristics when propagating through a particular medium. In other words, the refractive index of a particular medium varies according to the frequency of the particular signal which traverses that medium. Additionally, the refractive index of a particular medium also varies with atmospheric conditions such as temperature, pressure, and humidity.

Since beams 146 and 148 propagate through air, they should be out of phase by a predictable amount, after the frequency of beam 146 is doubled. However, if atmospheric disturbances are present along the measurement path, beams 146 and 148 will experience an additional difference in their respective indices of refraction and thus, an additional phase difference. Since, the index of refraction of a particular medium, such as air, varies in a known fashion with the wavelength of the propagating waveform, the second harmonic interferometer can determine the effect of the atmospheric disturbances from the phase difference between beams 146 and 148.

Figure 6:
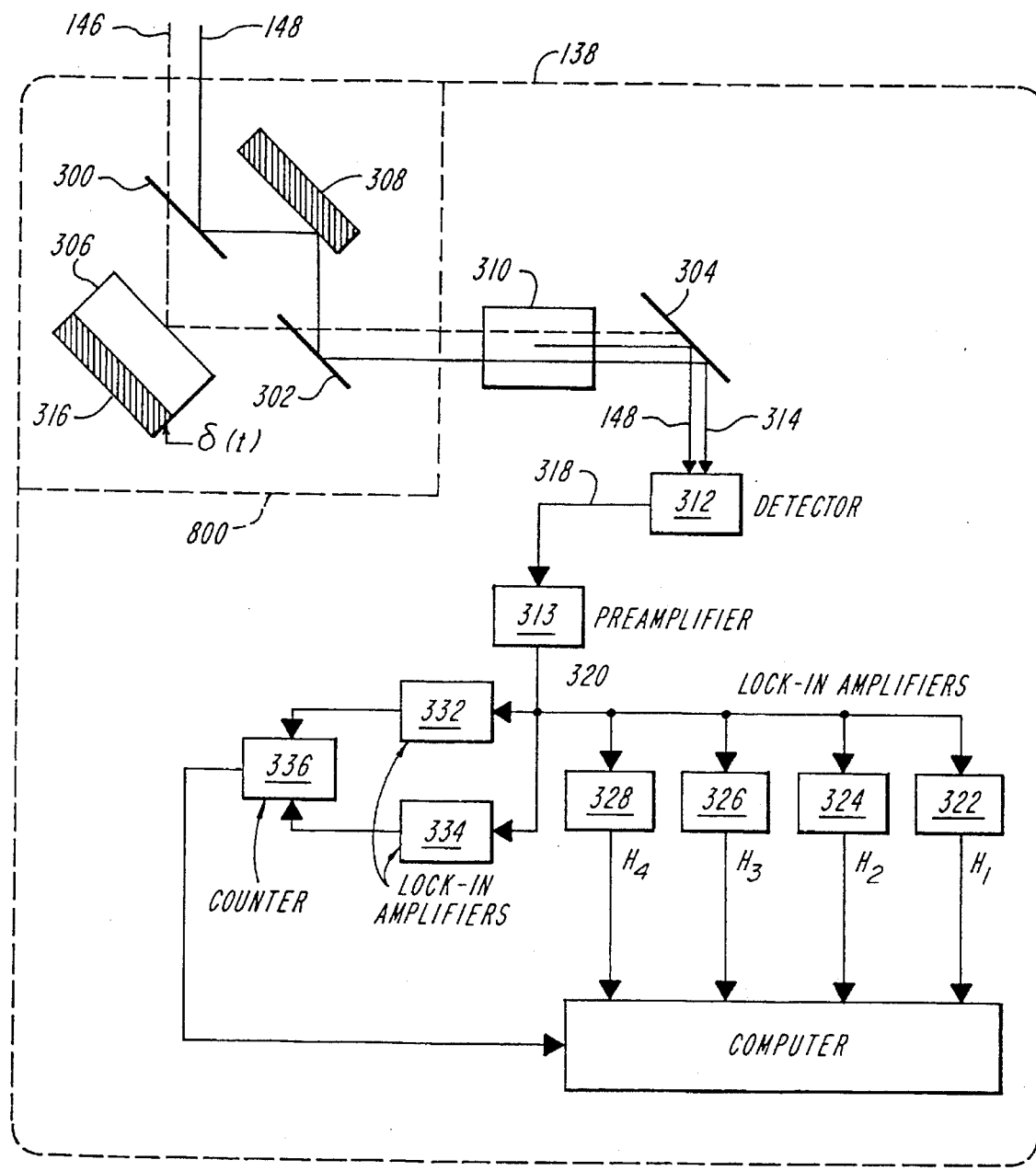
FIG. 6 is a detailed block diagram of the second harmonic interferometric sensor of FIG. 1.

FIG. 6 shows a more detailed block diagram of one embodiment of the second harmonic interferometric sensor 138 of FIG. 1. During operation, the doubled reflected detection beam 148 and the undoubled reflected detection beam 146 are separated by the beamsplitter 300, which reflects the beam 148 to the mirror 308 and passes the beam 146 to the mirror 306. The mirror 306 reflects the beam 146 to the frequency doubler 310 by way of the beamsplitter 302. The frequency doubler 310 shifts the frequency of the beam 146 so that this frequency will be substantially equal to the frequency of the beam 148 and then couples the shifted beam 314 to the detector 312. The mirror 308 couples the beam 148 via the beamsplitter 302, the frequency doubler 310, and the beamsplitter 304 to the detector 312. The detector 312 recombines the beams 148 and 314 and generates an interference signal 318 indicative of the phase difference between beams 148 and 314 and thus, representative of the error in the interferometric measurement due to atmospheric disturbances in the measurement path 110.

The piezoelectric modulator 316 (PZT) can be used to make fine adjustments to the optical path length traversed by beam 148. By way of example, the PZT can be driven by a small DC voltage (e.g., 100 V) to bring the beams 148 and 314 into phase. At the point where beams 148 and 314 are in phase, the interference signal 318 is maximized. As small changes in the air density along the measurement path 110 occur, the phase of the two beams 314 and 148 changes. As the beams 314 and 148 move out of phase, the intensity of signal 318 diminishes. According to one embodiment, signal 318 can be fed back to control the DC drive voltage to the PZT 316 so that the PZT 316 maintains the signal 318 at a maximum. The DC signal required to maintain beams 148 and 318 in phase is related to the phase difference between the two signals 148 and 314, and therefore, provides an accurate measurement of the change in the optical length of the measurement path 110 due to atmospheric disturbances.

Alternatively, the PZT 316 can be driven with a sinusoidal signal δ(t) to introduce a phase modulation on the beam 146. In this case, the light from beams 148 and 314 are interfered and then coupled to the detector 312, such as a model #UV-100BG, available from, EG&G Optoelectronics of Canada, and the electrical output signal 318 is amplified by a standard amplifier 313, such as a model 5113, available from EG&G Princeton Applied Research.

The time varying intensity of the buffered interference signal 320 is then given by:

$$I(t) = I_1 + I_2 + 2\sqrt{I_1 I_2}\ \cos(\phi + \delta(t))$$

where $I_1$ and $I_2$ are the irradiances from the two beams 148 and 314, respectively, $\phi$ is the phase difference between beams 148 and 314, and δ(t) is representative of the temporal phase shift of beam 148, induced by the PZT 316. If the temporal modulation is sinusoidal then:

$$\delta(t) = A \sin(\omega t)$$

where A is the amplitude of the temporal modulation. When the above two equations are combined, I(t) is given by:

$$I(t) = I_1 + I_2 + 2\sqrt{I_1 I_2}\ [\cos(\phi)\cos(A\sin(\omega t)) - \sin(\phi)\sin(A\sin(\omega t))].$$

The cosine of sine and the sine of sine can be expanded into an infinite series of Bessel functions so that:

$$I = I_1 + I_2 + 2\sqrt{I_1 I_2}\ [\cos(\phi)(J_0(A) + 2J_2(A)\cos(2\omega t) + \ldots) - \sin(\phi)(2J_1(A)\sin(\omega t) + 2J_3(A)\sin(3\omega t) + \ldots)]$$

This equation represents the interference signal 320, which is composed of a series of harmonics of δ(t).

A lock-in amplifier, such as a model 5209, available from Princeton Applied research, can process a sinusoidal modulation to provide the amplitude of the modulation at a particular frequency. Thus, by coupling signal 320 into several such amplifiers 322, 324, and 326, $H_1$, $H_2$, and $H_3$ are generated as follows:

$H_1 = 2J_1(A) \sin(\phi)$;

$H_2 = 2J_2(A) \cos(\phi)$; and $H_3 = 2J_3(A) \sin(\phi)$ where $H_1$, $H_2$, and $H_3$ are the first, second and third harmonics, respectively, of δ(t).

Combining the equations for the first and third harmonics, $\tan(\phi)$ is given by:

$$\tan(\phi) = \frac{\sin(\phi)}{\cos(\phi)} = \frac{H_1 J_2(A)}{H_2 J_1(A)}$$

and $\phi$ is given by:

$$\phi = \tan^{-1}\left(\frac{H_1 J_2(A)}{H_2 J_1(A)}\right)$$

If (A) is held constant, the Bessel functions are known values and the phase $\phi$ can be uniquely determined. Additionally, even if (A) is not held constant, but its range is limited, the value of (A) can be determined from the ratio of the first and the third harmonics or from the ratio of the second and the fourth harmonics. In this case:

$$\frac{H_1}{H_3} = \frac{J_1(A)}{J_3(A)} \text{ and } \frac{H_2}{H_4} = \frac{J_2(A)}{J_4(A)}$$

This allows (A) to be determined from a look-up table of ratios of Bessel functions. With (A) determined, the phase difference φ can be found by substituting into the above equations.

Figure 6A:
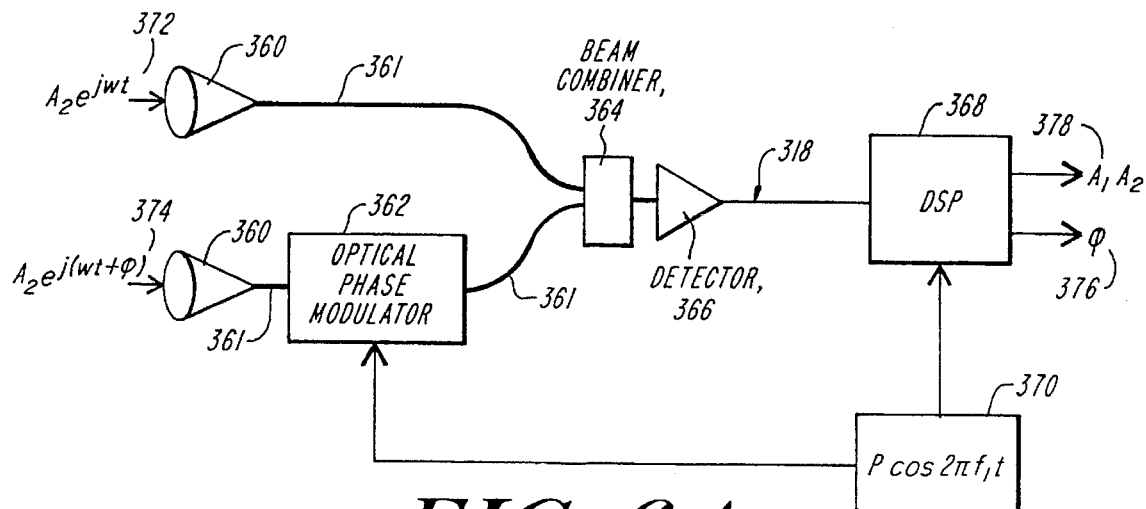
FIG. 6A is a functional block diagram of an optical interferometric sensor for measuring the phase difference between two coherent beams.

FIG. 6A is a functional block diagram of a second embodiment of the interferometric sensor 138 for determining the phase difference between two coherent beams of light. The interferometric sensor of FIG. 6A includes two lens elements 360, an optical phase modulator 362, a beam combiner 364, a detector element 366, a DSP data processor 368 and a signal generator 370. The sensor depicted in FIG. 6A is adapted to receive two coherent beams 372 and 374. The two beams are separated by a relative phase delay of φ and each beam oscillates a substantially the same frequency, ω. In the depicted embodiment the beam 374 is shown to have a phase delay of φ relative to the beam 372, however it should be apparent to one of ordinary skill in the art that this the phase delay could be expressed as a component of either signal or of both signals.

Each beam 372 and 374 is collected by a respective one of the lens elements 360 and optically couples to a fiber optic cable 361 that transmits the beam into the sensor. The beam 372 travels directly to the beam combiner element 364. The beam 374 travels to the optical phase modulator element 362 where it is modulated according to the signal generated by the signal generator 370. As explained above, the optical phase modulator 362 temporally phase shifts the beam 374. The temporal phase shift added to the signal 374 is a sinusoidal phase shift that periodically changes the phase between the two beams to increase and decrease the interference between the two signals. The added phase shift can shift the beam 374, such as through a half-wavelength of the beam 374, and thereby shifts the phase relationship between the two beams through a full cycle. This modulates the combined beam at the detector element 366 and creates an intensity that varies periodically as the beams move in and out of phase.

The detector element 366 measures the intensity of the combined beam and generates the interference signal 318 which is transmitted to the DSP data processor 368. The DSP data processor 368 couples to the signal generator 370 to monitor the phase modulation of the beam 374. As will be explained in greater detail hereinafter, the DSP data processor 368 generates a phase difference signal 376 that represents the relative phase delay, φ, between the beams 372 and 374. Optionally, the DSP data processor also generates an amplitude signal 378 that represents the amplitude of a harmonic component of the combined signal.

Figure 6B:
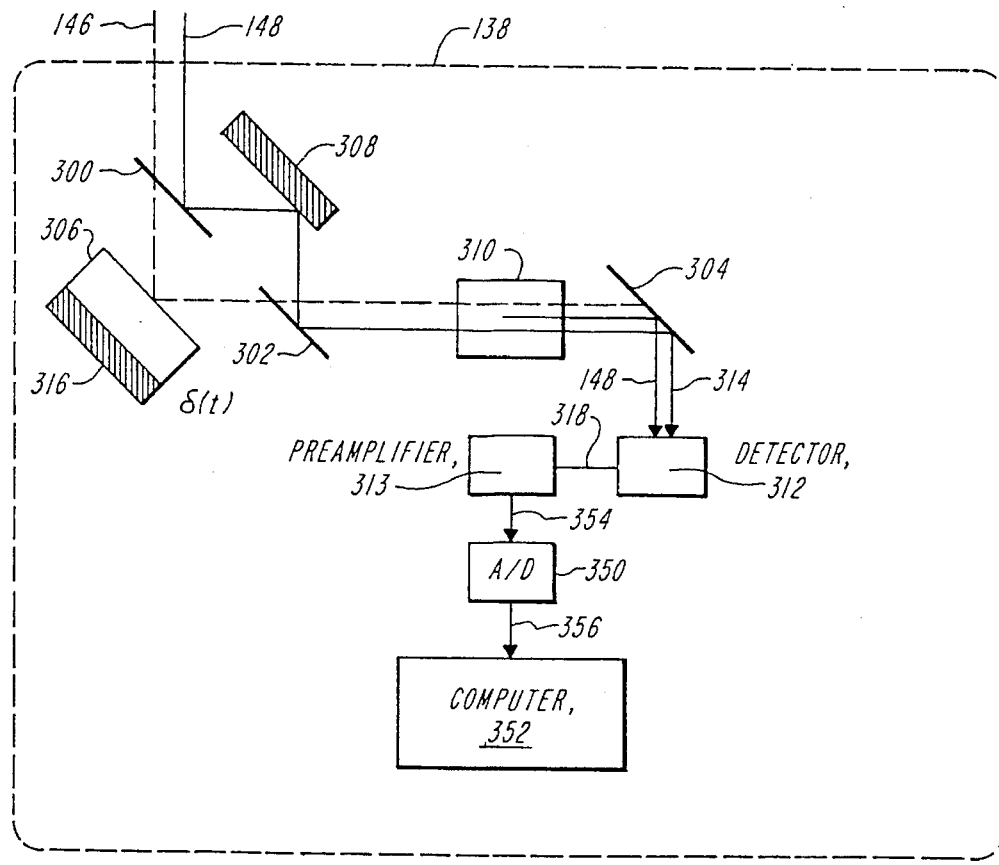
FIG. 6B is a detailed block diagram of one second harmonic interferometric sensor constructed according to the embodiment of FIG. 6A.

FIG. 6B shows a detailed block diagram of one realization of a harmonic interferometric sensor constructed according to the functional block diagram of FIG. 6A and that can be applied for example to the system 100 of FIG. 1. In FIG. 6B, the sensor 138 includes an A/D converter 350 and a DSP data processor 352. The A/D converter 350 and the DSP data processor 352 replace the electronic assembly of lock-in amplifiers illustrated in FIG. 6. The A/D converter 350 and the DSP data processor 352 can form a digital signal processing unit that processes the amplified intensity signal generated by the preamplifier 313 to calculate the phase difference between the beams 314 and 148.

In the embodiment depicted in FIG. 6B, the interference signal 318 is generated as discussed above with reference to FIG. 6. In particular, the frequency doubled reflected detection beam 148 and the detection beam 146 are separated by the beamsplitter 300, which reflects the beam 148 to the mirror 308 and passes the beam 146 to the mirror 306. The beams 146 and 148 pass through the sensor as discussed above and project onto the detector 312. The detector 312 recombines the beams 148 and 314 and generates the interference signal 318 indicative of the phase difference between beams 148 and 314 and thus, representative of the error in the interferometric measurement due to atmospheric disturbances in the measurement path 110. The interference signal 318 is transmitted to the preamplifier 313.

In the embodiment depicted in FIG. 6B, the preamplifier 313 is connected in electrical circuit to the A/D converter 350 and the A/D converter 350 connects in electrical circuit to the DSP data processor 352. The A/D converter 350 can be a conventional analog-to-digital converter that is adapted to sample an analog electrical data signal 354 and generate a digital data signal that 356 represents the voltage amplitude of the sampled analog signal. The construction of such converters is well known in the art of electrical engineering and suitable converters are commercially available. In one practice of the invention, the A/D converter 350 and DSP data processor are combined as parts of a data processing circuit board such as the digital signal processing boards commercially available from the Spectrum Signal Processing Corporation of Burnaby, B.C.

The DSP data processor 352 depicted in FIG. 6B is a data processing unit adapted for processing the digital data signal 356 to determine the phase difference between the beams 148 and 314. In the preferred embodiment, the DSP data processor 352 is a digital signal processor circuit, such as the ADSP 21020 manufactured by Analog Devices of Massachusetts, that includes on-board functionality for implementing signal processing functions such as fourier transforms. However, it should be apparent to one of ordinary skill in the art of electrical engineering and signal processing that the DSP data processor 352 can be a conventional data processing unit of the type that commonly include a central processing unit and a program memory. Other data processors can be practiced with the present invention without departing from the scope thereof.

In operation, the sensor element 138 sinusoidally modulates one of the coherent beams to generate a phase modulated signal. The phase modulated signal can be combined with the second coherent beam to generate a single beam having a sinusoidally varying intensity. The detector element 312 can measure this sinusoidally varying intensity and generate the interference signal 318. In the illustrated embodiment, the sinusoidally varying interference signal 318 is sent to the preamplifier 313 that has a user-selected gain. Typically the gain is set to amplify the signal 318 to a level suitable for processing by the A/D converter 350. The A/D converter samples the amplified signal 354 and generates the digital signal 356. The A/D converter samples the intensity signal 354 at a sufficiently high rate to acquire samples of the higher order frequency components of the signal. In one practice, the A/D samples at 48 KHz to capture frequencies of 24 KHz. The digital signal 356 is transmitted to the DSP data processor 352 that, as will be explained in greater detail hereinafter, processes the digital data to determine the phase difference between the two coherent beams.

In the embodiment illustrated in FIG. 6B, the optical phase modulator includes the mirror 306 that mechanically couples to the PZT 316 and is driven with a sinusoidal signal δ(t) to temporally phase shift the beam 146. In this case, the light from beams 148 and 314 are interfered and then coupled to the detector 312, such as a model #UV-100BG, available from EG&G Optoelectronics of Canada, and the electrical output signal 318 can be amplified by a standard amplifier 313, such as a model 5113, available from EG&G Princeton Applied Research. Preferably the preamplifier 313 has a linear gain over a wideband of frequencies that includes multiple harmonics of the fundamental frequency of the coherent beams 148 and 314. This linear gain allows the DSP data processor 352 to analyze, as will be explained in greater detail hereinafter, more accurately the harmonic components of the interference signal 318.

It should be apparent to one of ordinary skill in the art of optical engineering, that other configurations of the optical phase modulator can be practiced with the present invention without departing from the scope therefrom. These alternative configurations can include an optical phase modulator that employs a piezoelectric crystal connected to a signal generator and wrapped with a an optical fiber that carries the beam to be modulated. As the signal generator causes the piezoelectric crystal to oscillate, the path length of the an optical fiber periodically varies causing a periodic modulation of the beam traveling through the an optical fiber.

Moreover, it should be apparent to one of ordinary skill in the art of optical engineering, that the phase modulation of one of the interfering optical beams, 148 and 314, should be close to sinusoidal in nature and have low harmonic contamination. Consequently, the optical phase modulator 316 should operate at about several kilohertz. This modulation avoids the high detector and laser noise associated with operation at low frequencies and modulates the signal at a higher frequency than the frequency at which the air turbulence could affect the signal. In other applications of the interferometric sensor, such as imaging, AFM, and measuring angles, the modulation frequency is selected according to the criterion of that application and according to principles well known in the art of electrical engineering. Moreover, the particular optical modulator employed can be selected to suit the application at hand. For example, beams of microwave or other wavelengths can be phase modulated by phase modulators adapted for modulating longer wavelengths of electromagnetic energy. Therefore, it should be apparent to one of ordinary skill in the art of optical engineering, that other optical phase modulators can be employed in an interferometric system according to the present invention, without departing from the scope of the invention.

Figure 6C:
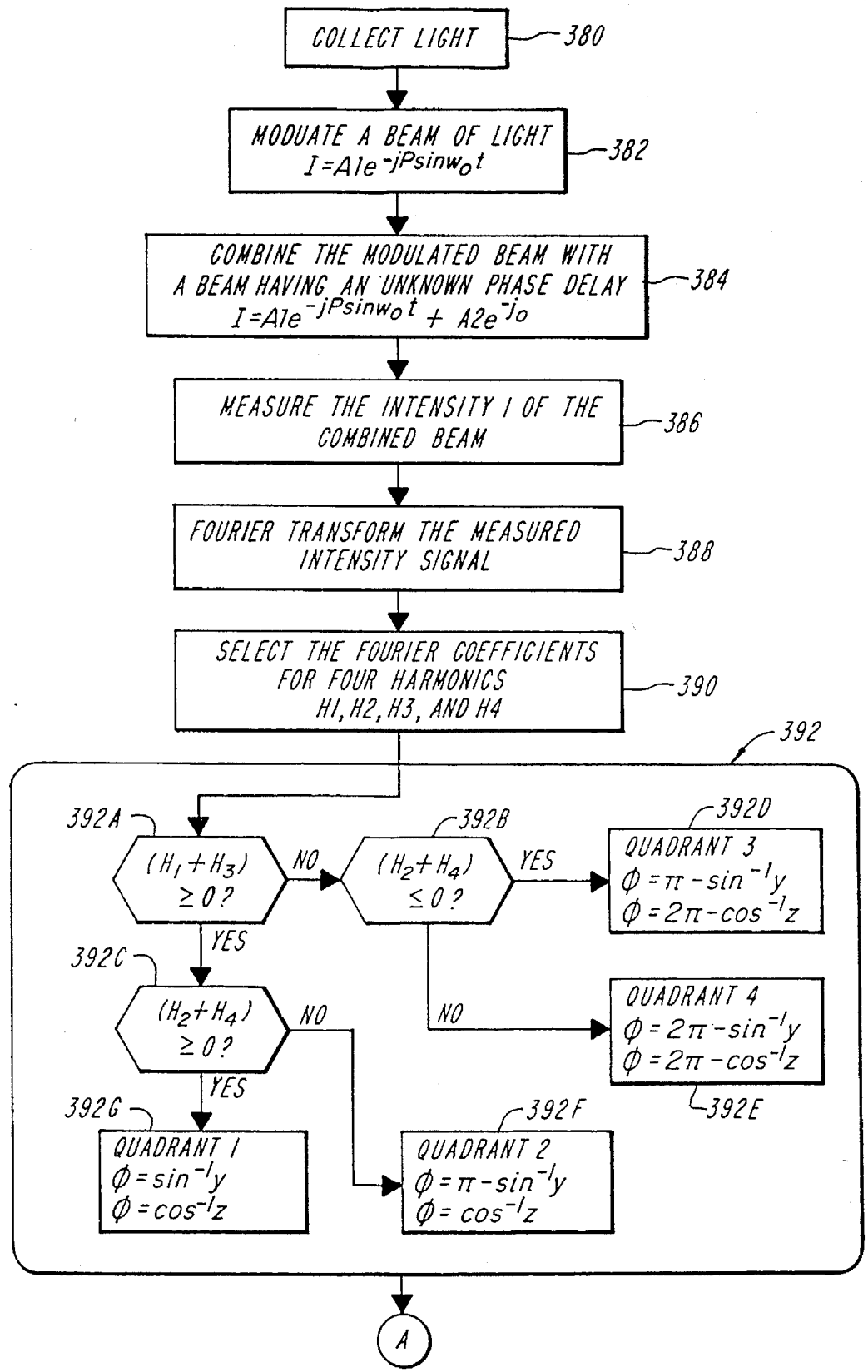
FIGS. 6C and 6D are a flow diagram of a signal processing operation, practicable with the interferometric sensor depicted in FIG. 6B, for determining the phase difference between two coherent beams.
Figure 6D:
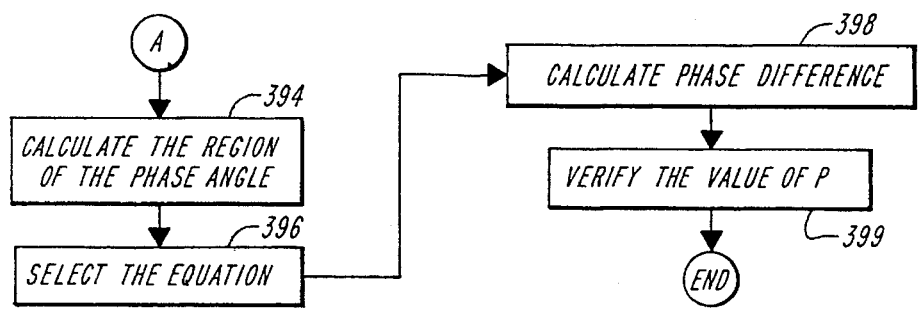

The operation of the DSP data processor 352 can be further understood with reference to FIGS. 6C and 6D. FIGS. 6C and 6D depict a flow chart representation of one process for determining the phase difference between two coherent signals, such as the signals 148 and 314. Generally, the process illustrated in FIGS. 6C and 6D includes steps for collecting beams of light from two sources of coherent light and phase modulating one of the beams. The phase modulated beams are combined and the intensity of the combined beam is measured and a signal is generated that represents the intensity of the combined beam. The intensity of the signal varies periodically, and the process includes a step for processing the signal to determine the frequency components. The frequency components are employed by the process to determine the phase difference between the two coherent beams.

More specifically, in a first step, step 380, light is collected from two sources of coherent light. In step 382, one beam of light is phase modulated, typically by the optical phase modulator, to generate a modulated beam that has an intensity which varies at a select frequency. The key characteristics of the optical field of the modulated beam can be represented by:

$$E_1 = A_1 e^{-jP \sin(\omega_0 t + \theta)}$$

where E is the optical field of the modulated signal, A is the amplitude of the light beam being modulated, $\omega_0$, is the frequency of modulation, P is the magnitude of the modulation, such as one-half a wavelength of the modulated beam, and $\theta$ is the lead or lag associated with the phase modulator hardware.

A second beam, $E_2$, is also collected. The second beam can have unknown phase delay, $\phi$, such as the phase delay caused by air turbulence, or a change in path length. This phase delay typically is representative of the measurement being made with the interferometer and can represent a distance, can angle or other measure. $E_2$ represents the key characteristics of the optical field of the beam and is given by:

$$E_2 = A_2 e^{-j\phi}$$

In step 384 the modulated beam is combined, or interfered, with the other beam, $E_2$, to generate a combined beam that has an intensity given by:

$$I = |E_1 + E_2|^2 = |A_1 e^{-jP \sin(\omega_0 t + \theta)} + A_2 e^{-j\phi}|^2$$

Where $\phi$ can indicate the phase delay caused by air turbulence.

The intensity of the combined beam can be measured in step 386. This beam can be assumed to be periodic with period $\omega_0$. Accordingly the Fourier series coefficients, $a_n$ and $b_n$, of the harmonic components of the signal I are calculated in step 388. Generally the fourier coefficients are given by:

$$a_n = \frac{1}{\pi} \int_{-\pi}^{\pi} f(x) \cos nx \, dx,$$

$$b_n = \frac{1}{\pi} \int_{-\pi}^{\pi} f(x) \cos nx \, dx.$$

After reduction, the cosine coefficients, $a_n$, for the intensity signal, I, out of the interferometer can be written as:

$$a_n = 2A_1 A_2 J_n(P)[\cos(\phi - n\theta) - \cos(\phi + n\theta)] = 4A_1 A_2 J_n(P) \sin \phi \sin n\theta, \ n \text{ odd,}$$

$$a_n = 2A_1 A_2 J_n(P)[\cos(\phi - n\theta) + \cos(\phi + n\theta)] = 4A_1 A_2 J_n(P) \cos \phi \cos n\theta, \ n \text{ even.}$$

The Fourier sine coefficients, $b_n$, after reduction, can be written as:

$$b_n = 2A_1 A_2 J_n(P)[\sin(\phi - n\theta) + \sin(\phi + n\theta)] = 4A_1 A_2 J_n(P) \sin \phi \cos n\theta, \ n \text{ odd,}$$

$$b_n = 2A_1 A_2 J_n(P)[\sin(\phi - n\theta) - \sin(\phi + n\theta)] = -4A_1 A_2 J_n(P) \cos \phi \sin n\theta, \ n \text{ even,}$$

where $J_n(P)$ represents a Bessel function equation for the amplitude of the nth harmonic component of the intensity signal, I. Moreover, the phase shift $\theta$ is a constant phase shift caused by the optical phase modulator and can be determined empirically by methods well known in the art of optical engineering. Accordingly, $\theta$ can be eliminated as a variable from the equations.

In step 390, the expressions for the amplitudes of four non-zero harmonics, $H_1$, $H_2$, $H_3$ and $H_4$, are selected. In this step the process can measure any two of the odd and any two of the even harmonic components of the signal. Preferably, the first four components, with frequencies $\omega_O$, $2\omega_O$, $3\omega_O$, $4\omega_O$ are measured. These lower frequency components can contain more accurate information about the phase relationship of the harmonic components and therefore more accurate information about the phase difference between the beams. The amplitude of the components can be solved for according to:

$H_1 = b_1 = 4A_1A_2J_1(P) \sin\phi = 4I_mJ_1(P) \sin\phi,$
$H_2 = a_2 = 4A_1A_2J_2(P) \cos\phi = 4I_mJ_2(P) \cos\phi,$
$H_3 = b_3 = 4A_1A_2J_3(P) \sin\phi = 4I_mJ_3(P) \sin\phi,$
$H_4 = a_4 = 4A_1A_2J_4(P) \cos\phi = 4I_mJ_4(P) \cos\phi.$ These four harmonic components $H_1$, $H_2$, $H_3$ and $H_4$ can be employed to calculate the phase difference between the two coherent beams. As discussed above with reference to FIG. 6, the ratios of two harmonic components can be taken to determine, as a function of the arctan, the phase difference $\phi$. Alternatively, the four harmonic components can be used. As can be seen from the below equations, by employing the four harmonic equations, the amplitude, A, can be removed as a factor from the calculation. This approach decreases the effects of noise and achieves more fine measurements. In some systems, resolution of $\lambda/1000$ can be achieved. There are three equations that can be employed. These equations can be written as:

$$X = \pm\sqrt{\frac{4H_2(H_2+H_4)}{6H_3(H_1+H_3)}}$$

$$Y = \pm\sqrt{\frac{6H_3(H_1+H_3)}{4H_2(H_2+H_4)+6H_3(H_1+H_3)}}$$

$$Z = \pm\sqrt{\frac{4H_2(H_2+H_4)}{4H_2(H_2+H_4)+6H_3(H_1+H_3)}}$$

Where $Y = \sin\phi$, and $Z = \cos\phi$ and $X = \tan\phi$.

Any of these equations can be employed to determine the phase delay, $\phi$, between the two coherent signals. Once the selected equation is applied and an answer is achieved the quadrant of the angle can be determined in order to correct for the proper choice of sign associated with the square root operations.

In step 392 the quadrant of the phase difference angle is determined using the signs of the harmonics In quadrant 1
$(H_1+H_3) \geq 0$, and $(H_2+H_4) \geq 0$, and $\phi = \sin^{-1} Y$ or $\phi = \cos^{-1} Z$ or $\phi = \tan^{-1} X$ In quadrant 2,
$(H_1+H_3) \geq 0$, and $(H_2+H_4) \leq 0$, and $\phi = \pi - \sin^{-1} Y$ or $\phi = \pi - \cos^{-1} Z$ or $\phi = \pi - \tan^{-1} X$ In quadrant 3,
$(H_1+H_3) \leq 0$, and $(H_2+H_4) \leq 0$, and $\phi = \pi + \sin^{-1} Y$ or $\phi = \pi + \cos^{-1} Z$ or $\phi = \pi + \tan^{-1} X$ In quadrant 4,
$(H_1+H_3) \leq 0$, and $(H_2+H_4) \geq 0$, and $\phi = 2\pi - \sin^{-1} Y$ or $\phi = 2\pi - \cos^{-1} Z$ or $\phi = 2\pi - \tan^{-1} X$ The signs for the Harmonic components are given by the above equations for $H_1$, $H_2$, $H_3$ and $H_4$. Alternatively, as can be seen from the above description, the signs for the Harmonic components can be empirically determined by calculating the sixteen different combinations and calculating the phase difference using these sixteen different calculations. The proper selection of signs will produce an estimated phase that is linearly related to the true phase over a range of 0 to $2\pi$.

Once the quadrant of the phase difference is calculated, the process can proceed to step 398 and determine the phase difference using either the inverse sine the inverse cosine or the inverse tangent solution.

Alternatively, the process, in the illustrated steps 394 and 396, can select between the inverse sine solution and the inverse cosine solution to select the solution that is more resistant to the effects of noise.

The inverse sine solution is understood to be sensitive to noise at $$\phi = \frac{(2n+1)\pi}{2},$$

while the inverse cosine solution is understood to be sensitive to noise at $\phi = n\pi$. Therefore, the inverse sine solution can be selected if:

$|3H_3(H_1+H_3)| \leq |2H_2(H_2+H_4)|$ and the inverse cosine solution can be selected otherwise. A third alternative, using either the inverse tangent or cotangent can also be selected.

In a final optional step 399, an approximate value for the amplitude of the phase modulation, P, can be calculated to determine whether the optical phase modulator is operating properly. If the optical phase modulator is operating properly, a valid solution will exist for at least one of the ratios of the odd or the even harmonic component. If the higher order harmonic component of either the odd or the even harmonic components are both zero, then the optical phase modulator can be assumed to be malfunctioning.

From the above description, one aspect of the invention is shown, that the four harmonics of $\omega_O$ present in the output intensity of the interferometer, contain all the information required to determine the four unknowns, and the solution of the problem. This provides an interferometric system that calculates the phase difference in manner that is resistant to signal noise that affects the amplitude of the combined signal. Therefore, it should be apparent to one of ordinary skill that there are many applications for the precise phase comparison of two optical signals achieved by the present invention. These applications include high-resolution tracking systems using arrays of small apertures, and operating at optical, mm-wave, or radar wavelengths. Other applications would include precise location of radio-frequency emitters; high resolution imaging systems, metrology systems where precise phase information is required in manufacturing such as optical interferometers and atomic force microscopy.

As discussed above, the effects of atmospheric disturbances on accurately positioning mirror 120 increase as the length of path 107 increases. More particularly, in the example of FIG. 6, the undoubled beam 144 has a wavelength 532 nm and the frequency doubled beam 142 has a wavelength of 266 nm. As shown in FIG. 5, the difference in the refractive index of air seen by a beam having a wavelength of 266 nm versus a beam having a wavelength of 532 nm is approximately $2.0 \times 10^{-5}$. If we assume a 20 cm length for path 110 and also that the system is a double pass system, then the actual length of path 110 becomes 80 cm. Over an 80 cm path in air the chromatic shift between beam 142 and 144 is then $|\Delta n| = 16$ μm, which translates to approximately 64 wavelengths for the 266 nm beam of FIG. 6. Consequently, as mirror 120 moves and path 107 changes in length from 0 to 20 cm, the chromatic shift changes from 0 to approximately 64 wavelengths. Additionally, if we assume a 0.1% change in ρ due to atmospheric disturbances, then over the 80 cm path there is an additional chromatic shift between beams 142 and 144 of 16 nm.

As one skilled in the art will appreciate, the approach discussed above with respect to FIG. 6 provides a very fine granularity measurement for determining the portion of the chromatic shift that is a fraction of one wavelength of beam 144. However, additional circuitry is needed to provide the coarse counting of whole wavelength shifts.

As beams 314 and 148 pass in and out of phase, the relative amplitudes of signals $H_1$ and $H_2$ wax and wane. Thus, according to one embodiment, the sensor 138 counts transitions from when the amplitude of $H_1$ is greater than $H_2$ to ones where it is less. In the case where the invention is operating with a lithographic stepper, this requires a sampling rate and a frequency of operation that is compatible with the rate of movement of the lithographic stage. In any case, the sampling rate must be fast enough to accommodate the maximum rate of change in the position of mirror 120.

In one prior art lithographic stepper system, the maximum allowable Doppler shift is 20 MHz, leading to a limiting stage speed of 3.15 m/sec in a double pass system. This results in the sensor 138 having to count 1008 wavelengths/second. The sampling rate should be several times this rate and the PZT modulation should be several times the sampling rate.

Consequently, as shown in FIG. 6, the sensor 138 further includes a second pair of lock-in amplifiers 332 and 334, and a counting network 336. Amplifiers 332 and 334 couple the signals $H_1$ and $H_2$, respectively, to the counting network 336. The counting network 336 samples $H_1$ and $H_2$ at 4 kHz, to monitor amplitude transitions between $H_1$ and $H_2$, thereby essentially counting interference fringes between beams 148 and 314.

According to a further embodiment, by over sampling, the network 336 can also determine the local slope as well as the relative amplitudes and thereby keep track of which direction the mirror 120 is moving.

As mentioned above, in one preferred application, the interferometer 100 can be used to control the position of a lithographic stepper. The air turbulence in such steppers have a time constant of the order of seconds, and thus, determining the phase change every 10 to 100 ms is sufficient. At such low sampling rates, 1/frequency noise in the sensor 138 can be a problem. However, a further advantage of the sinusoidal modulation, introduced by the PZT 316 is that by driving the PZT 316 at some arbitrary frequency, such as for example, in the range of 3 to 10 kHz, the 1/frequency noise can be substantially reduced.

To improve the accuracy of the sensor 138, an additional electronic detector can be used to sample the time varying fluctuations in the intensity of the beam 140, prior to being coupled to the frequency doubler 136. The information gained from this detector can be used to compensate for such fluctuations in real time, and thereby reduce the effective noise in the measurements due to fluctuations in the intensity of the source.

Like the optical components utilized in network 102, the components employed in the network 104 are also well known to those skilled in the art. Generally, the selection of the light source 134 is influenced by a number of factors, such as the stability of the laser intensity, the absolute value of the intensity, and the constancy of the absolute wavelength. Likewise, the remaining components are selected based on their ability to provide efficient separation, recombination, transmission, and polarization rotation of the light generated by the source 134. To this end, improvements in components are constantly being made and alternative designs to this invention are possible and practicable to those skilled in the art.

In one preferred embodiment, the network 104 employs a diode pumped doubled YAG laser 134, such as a model #DPY-425, available from Adlas, Inc. This recently developed all solid state laser provides output powers up to 400 mW, with the expectation that within a few years power levels will exceed 1 W. The 400 mW power level is sufficient so that the power loss in the frequency doubler 136 will not affect the accuracy of the interferometric measurement. Additionally, the output is highly plane polarized and need not exhibit the dual frequency characteristics of the HeNe laser 106. Alternatively, the laser 134 can be an Argon laser which is stabilized against frequency drift.

With regard to the frequency doubler 136, one such as that available from Quantum Technologies, Inc., can be employed. Such a frequency doubler utilizes carefully aligned crystals of ammonium dihydrogen phosphate (ADP) which are temperature controlled to provide the proper doubling efficiency. Additionally, those crystals are essentially transparent to all three wavelengths used and provide adequate doubling efficiency.

With regard to the beam directing optics and by way of further example, each of the three wavelength selective beamsplitters 300, 302, and 304 can be a model #BSR-25-2037, available from CVI Laser Optics. In an alternative approach, the beam directing optical elements 300 and 302 can be polarization sensitive calcite beamsplitters such as model #MGTYB8 from Karl Lambrecht Corp. To use these beamsplitters for optimal separation of the beams one is required to insert a dual wavelength waveplate such as model #QWPD-532.0-2-266.0-1-10 from CVI Laser Corp. into the beam 146 and 148 before optical element 300. The two mirrors 306 and 308 can be a model #02-MLQ-001/016 and model #02-MLQ-001/028, respectively, both available from Melles Griot. The frequency doubler 310 can be of the ADP type. The piezoelectric modulator 314 can be a part #P-170.00, available from Physik Instruments.

Components 300, 302, 306, 308, and 316 are arranged in FIG. 6 in what is commonly referred to as a Mach-Zehnder assembly 800. As discussed above, the assembly 800 provides a mechanism for introducing a phase modulation to one of beams 146 and 148. According to a preferred embodiment, the assembly 800 applies the phase modulation to only one of the beams 146 and 148, with minimal cross-talk. To enable sensor 138 to perform an accurate interferometric phase determination, the separation between beams 146 and 148 is achieved with minimal cross-talk to better than one part in $10^{-6}$. Additionally, assembly 800 preferably imparts the phase modulation with minimal optical loss. In this way, the light intensity of the modulated beam is maintained and a high signal to noise ratio is achieved.

Figure 7A:
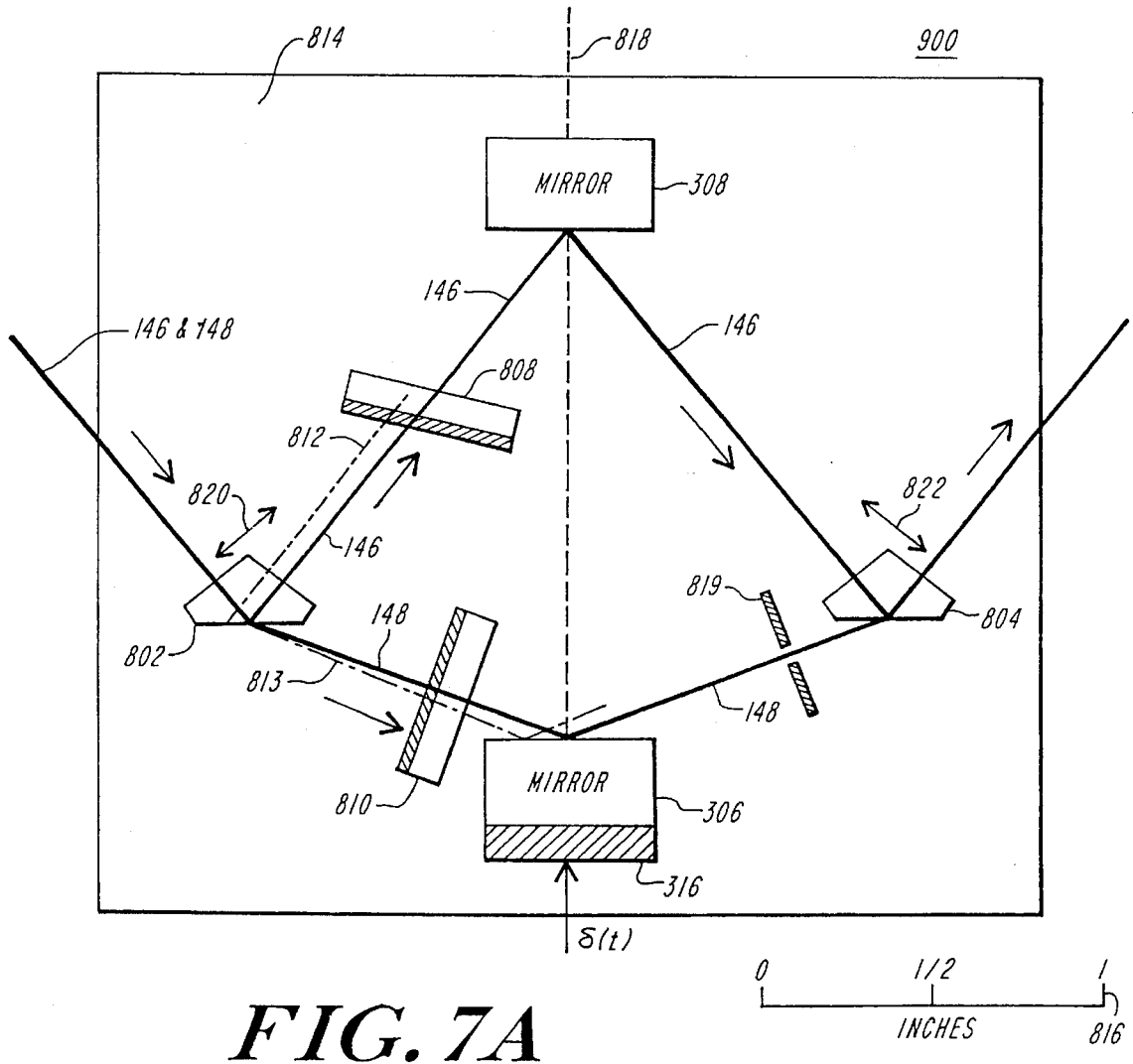
FIG. 7A is a schematic block diagram of an alternative configuration of the Mach-Zehnder assembly of FIG. 6.

FIG. 7A shows a schematic block diagram for an alternate configuration 900 for the Mach-Zehnder assembly 800. The assembly 900 not only provides minimal cross talk and optical losses, but also provides thermal compensation. As in the case of the Mach-Zehnder assembly 800, the assembly 900 follows the configuration of two beamsplitters 802 and 804 and two reflecting mirrors 306 and 308. A first polarization sensitive beamsplitter 802 separates the two beams; UV beam 148 (at 266 nm) and green beam 146 (at 532 nm). A second polarization sensitive beamsplitter 804 recombines beams 146 and 148 in a symmetrical optical arrangement. The mechanical motion of mirror 306, actuated by piezoelectric or electrostrictive device 316, imparts the phase modulation. An electrostrictive device is preferable, because it displays less hysteresis than a piezo-electric device, and because it exhibits a more linear response at certain bias voltages.

According to a preferred embodiment, mirrors 306 and 308 in FIG. 7A are identical to those depicted in FIG. 6.

Similarly, device 316 in FIG. 7A can also be the same as that shown in FIG. 6. Alternatively, device 316 can be an electrostrictive modulator, model #MT 15, available from Queensgate Instruments, Inc.

The Mach-Zehnder design of FIGS. 6 and 7A provides a convenient mechanism for processing beams 146 and 148. However, one drawback to the Mach-Zehnder configuration is that it is the only section of interferometer 100 where the UV and green beams are not essentially collinear. Consequently, any disturbances, such as those associated with thermal expansion or thermal drift, experienced by one beam is not necessarily experienced by the other. This can lead to significant inaccuracies in the generation of interference signal 320. By way of example, a small change in temperature can result in a thermal expansion, causing one of the optical paths to change at a greater rate than the other. Over the time period of a measurement, which for IC manufacturing applications can be as long as several minutes, even a one nanometer change in the path length difference can be an important factor. Therefore, it is important that the paths traversed by the UV beam 148 and the green beam 146 be compensated for thermal expansion effects.

Achieving thermal stability is complicated by the further requirement that the separation between beams 148 and 146 be efficient and clean. Separation of beams 146 and 148 can be accomplished based either on wavelength differences or on polarization differences. Wavelength-based separation can be achieved using dichroic filters, such as shown at 300 and 302 in FIG. 6. However, several filters, which tend to induce reflection losses, are typically required to achieve clean separation of the UV 148 and green 146 beams. Alternatively, separation based on polarization effects is more efficient and provides reduced cross talk, if materials of high birefringence are used. Separation based on polarization is also advantageous because when green beam 140 is frequency doubled by doubler 136, the resulting UV beam 142 may be generated at a polarization orthogonal to the green beam 144. Thus, separation by polarization can be implemented, without further beam manipulation.

Therefore, according to a preferred embodiment, beamsplitters 802 and 804 are constructed from calcite crystal. Calcite is particularly suitable because it provides a relatively high birefringence, which provides for clean polarization-based separation between beams 142 and 144. Calcite also provides sufficient transmission in both the green and UV wavelengths. Additionally, calcite exhibits relatively high dispersion properties, which provide additional wavelength-based separation. More particularly, the dispersion characteristics of calcite cause an angular separation between beams 148 and 813, thereby enabling the use of a simple aperture to block any leakage. By way of example, aperture 819 enables the UV beam 148 to pass to beamsplitter 804 while blocking the green leakage beam 813. A green absorbing plate 810 can be employed, which further blocks green leakage beam 813 while transmitting UV beam 148. Similarly, absorbing plate 808, can operate to block UV leakage beam 812, while passing green beam 146 to the mirror 308.

As mentioned above, the assembly 900 is temperature compensated. The temperature compensation is achieved by mounting the depicted components on an aluminum plate 814. In providing temperature compensation, several factors should be weighed. One factor is that the UV path, formed by components 802, 810, 306, 148 and 804, and the green path, formed by components 802, 808, 308, and 804, are not of equal length. Another factor is that the refractive indices of calcite are temperature dependent. Also, the thermal coefficients of calcite in the green and UV are neither equal nor isometric.

According to a preferred embodiment of the invention, assembly 900 achieves thermal stability by balancing the thermal expansion coefficient of aluminum with the thermal coefficients of calcite. More specifically, the total change in optical path with temperature at each wavelength is considered. Each path change has contributions from the thermal expansion of the entire assembly (i.e. contributions due to the thermal expansion coefficient of aluminum) and from the temperature dependent refractive index changes of the calcite.

Figure 7B:
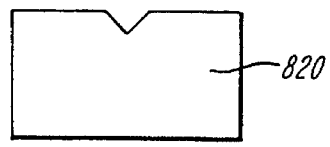
FIG. 7B is a cross sectional view of a channel, employed in the assembly of FIG. 7A to minimize atmospheric disturbances on a beam of light.

Quantitatively, as the aluminum assembly expands, the green path increases in length faster than the UV path. As can be seen in FIG. 7, this results because the green path starts out being longer than the UV path. However, the temperature coefficient of the index of refraction of calcite in the UV is more than a factor of two greater than the temperature coefficient of the index of refraction of calcite in the green. The net result is that the greater thermal expansion of the green path, due to the expansion of the aluminum plate 814, can be directly balanced by the temperature coefficients of the index of refraction of the calcite, which cause greater path length changes for the UV.

Additional factors such as, the thermal expansion effects of the calcite, and how the changing dispersion of the calcite causes the UV beam to "walk" across the surface of device 804, can also be taken into account, and compensated. Since the properties of the calcite and aluminum are used to balance each other, the physical dimensions of the assembly 900 scale with the size of the calcite elements used. FIG. 7A, through scale 816, shows the approximate dimensional relationships for assembly 900, for calcite elements 802 and 804 having approximately 6 mm dimensions. According to a preferred embodiment, aluminum plate 814 is approximately 10 cm wide, 10 cm long, and 3 cm thick.

An additional requirement for the stability of the system 900 is that thermal expansion effects make minimal impact on the beam direction and collinearity. According to one embodiment, this is accomplished by constructing the assembly 900 to be mirror-symmetric about the centerline 818. Thus, the optical axes 820 and 822 of the two calcite elements 802 and 804 are placed in a mirror symmetric arrangement, as shown in FIG. 7A.

According to further embodiments of the invention, several other advantages are realized by assembly 900. First, the optical elements of FIG. 7A are rigidly mounted on the aluminum base 814. Consequently, the entire assembly 900 is relatively rigid at frequencies near the driving frequency range of 3 to 10 kHz. Second, the elements 802 and 804 are mounted in a substantially stress free manner (kinematically) so that minimal stress birefringence is introduced into the crystals. Such birefringence can alter the wavefront of the optical beams 146 and 148. Third, the optical paths, where the UV beam 148 and the green beam 146 are separated, are relatively short and controlled to minimized the effects related to atmospheric turbulence. The mode of control can be, for example, placing the assembly 900 in a vacuum or in helium. Helium is a preferable choice, because it enhances thermal exchange and uniformity within the assembly. Alternatively, channels, such as shown at 820 in FIG. 7B, can be provided in the plate 814, along the optical paths of beams 146 and 148, to restrict atmospheric turbulence further. According to one preferred embodiment, both approaches are employed to enhance stability.

Figure 8A:
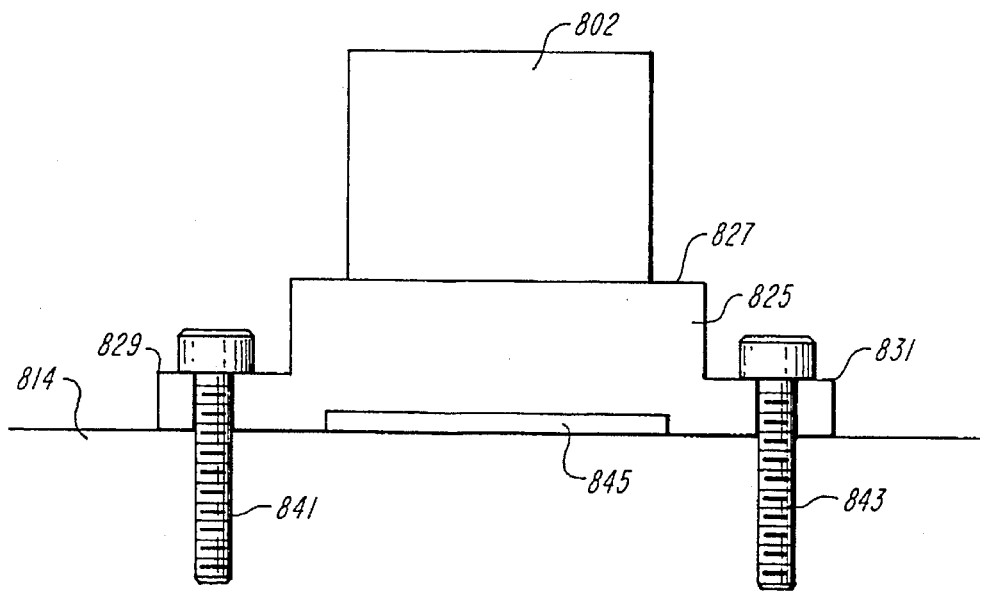
FIG. 8A is a side view of a stress-free mounting assembly.
Figure 8B:
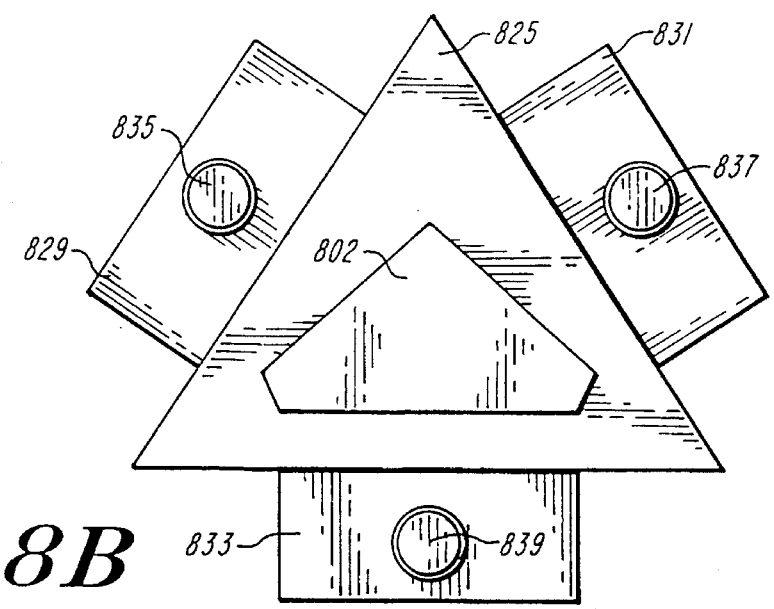
FIG. 8B is a top view of the stress-free mounting assembly of FIG. 8A.

FIGS. 8A and 8B depict a side view and a top view, respectively, of a stress-free mount 825 for calcite beamsplitters 802 and 804. The mount 825 has a top surface 827, on which the beamsplitter 802 is affixed. The mount 825 also includes mounting pads 829, 831 and 833. The pads 829, 831 and 833 each have mounting holes 835,837 and 839, respectively. The mounting hole 835 is adapted to enable a threaded mounting bolt 841 to fasten pad 829 to base plate 814. Mounting holes 837 and 839 are similarly adapted. In the configuration of FIGS. 8A and 8B, the mounting pads 829, 831 and 833 deform to absorb stresses that would otherwise couple to beamsplitter 802. Additionally, space 845 reduces the likelihood that imperfections in the surface of base plate 814 will cause stress on beamsplitter 802.

Figure 9A:
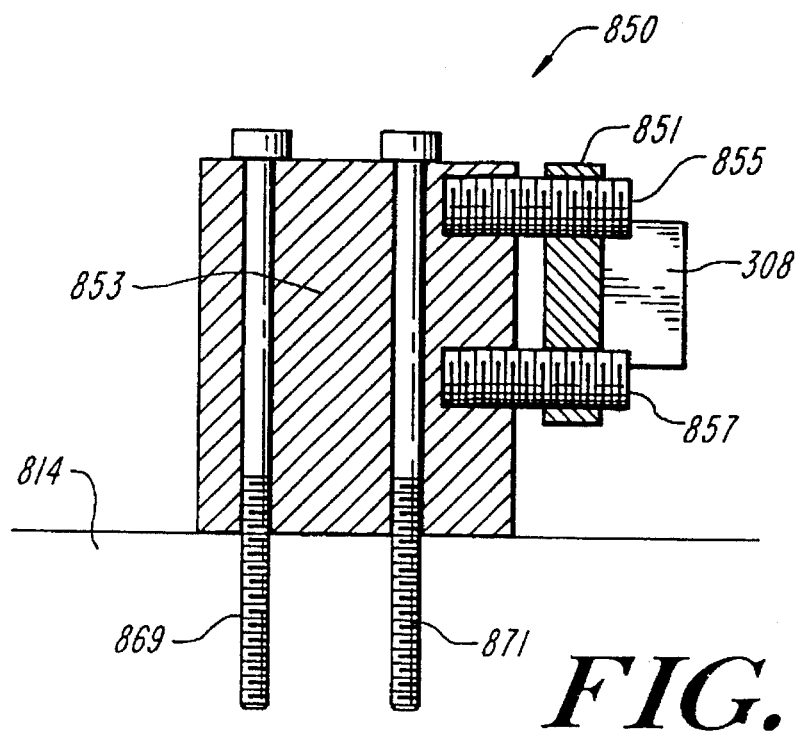
FIG. 9A is a side view of a rigid mounting assembly.
Figure 9B:
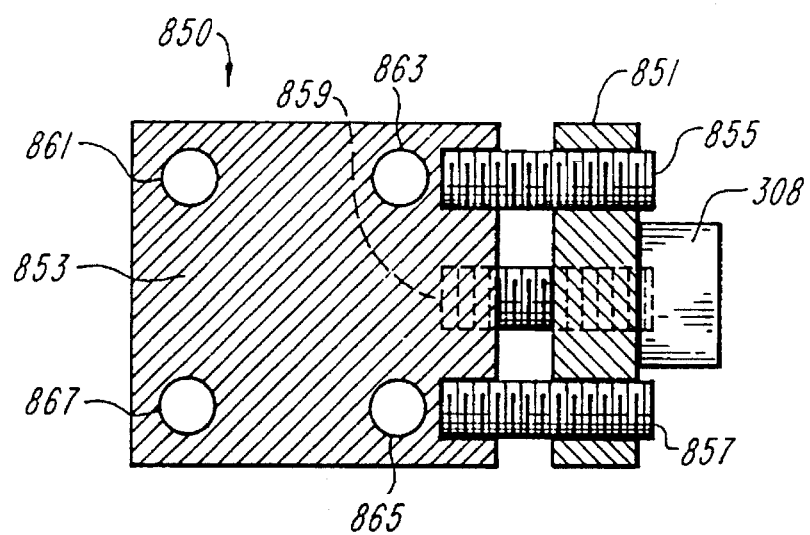
FIG. 9B is a top view of the rigid mounting assembly of FIG. 9A.

FIGS. 9A and 9B show a side view and a top view, respectively, of a rigid mount 850 of the type used for mirrors 306 and 308. The mirror 306 affixes to a mounting plate 851. Mounting plate 851 adjustably fastens to mounting block 853 by way of push/pull locking adjustment screws 855,857 and 859. Screws 855,857o and 859 adjust to set the angle of deflection of mirror 308, and then lock in place to fasten mirror 308 into position. The mounting block 853 includes apertures 861,863,865 and 867, through which mounting bolts, such as those shown at 869 and 871 can pass to secure block 853 to base plate 814.

Figure 10A:
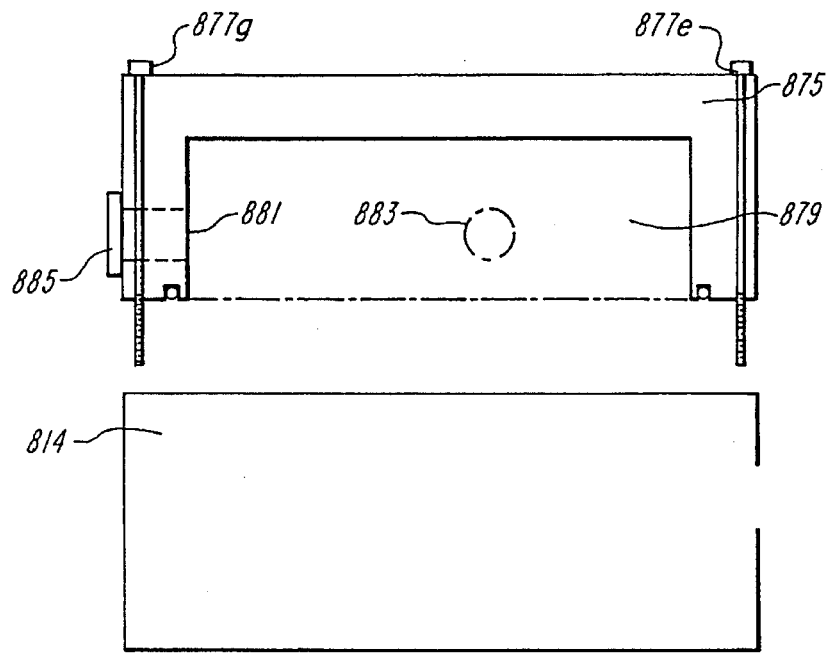
FIG. 10A is a cut away side view of a gas-tight chamber assembly.
Figure 10B:
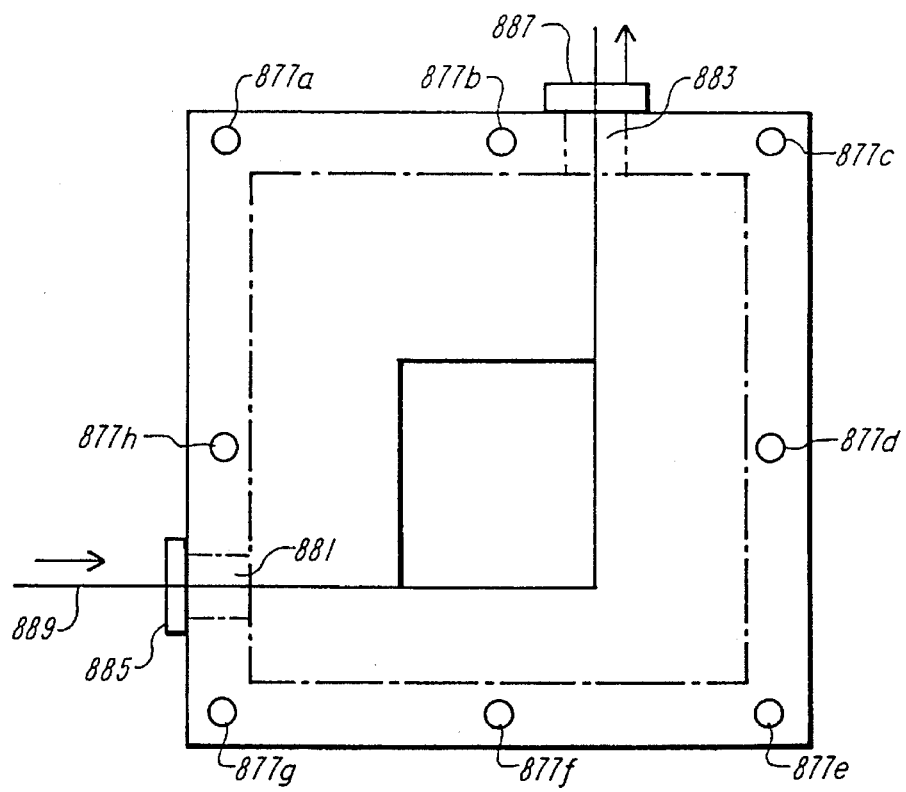
FIG. 10B is a side view of the gas-tight chamber assembly of FIG. 10A.

FIGS. 10A and 10B show a cut away side view and a top view of an enclosure 875, which can be fitted to base plate 814 and filled with a gas, such as helium. As can be seen, enclosure 875 mounts to base plate 814, via mounting bolts 877a–877h to form a gas-tight chamber 879. Light beams 889 can enter and exit the chamber 879 by way of beam ports 881 and 883. Beam ports 881 and 883 also include optical windows 885 and 887, respectively.

As discussed above, the configuration of FIG. 1 enables the measurement beam and the detection beams to traverse their respective paths a plurality of times. Several alternate optical configurations can achieve this same result.

Figure 11:
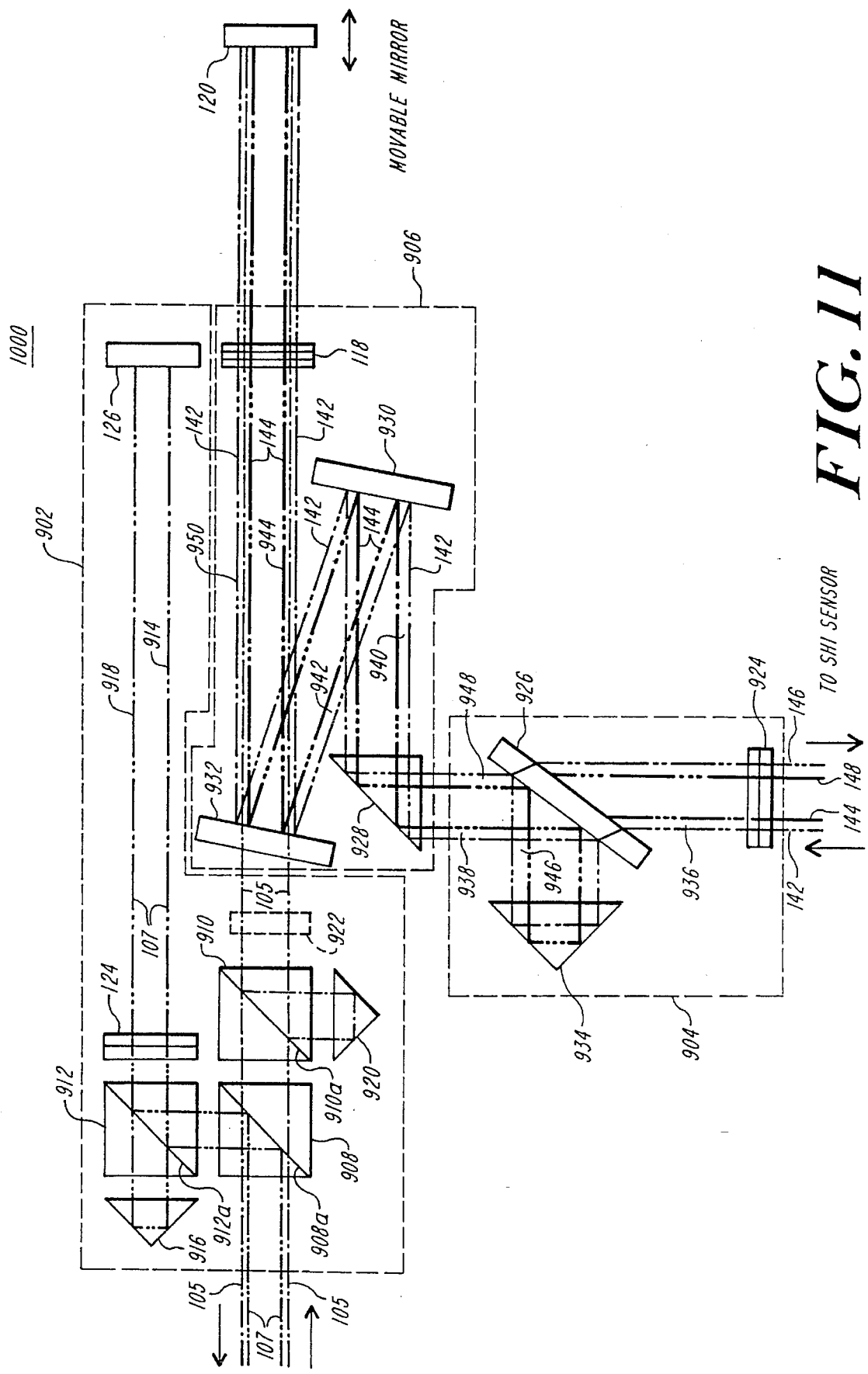
FIG. 11 is a schematic block diagram of an alternate arrangement of the beam directing optics of FIG. 1.

FIG. 11 shows an alternate optical configuration 1000 in which the elements 116, 122, and 130 of FIG. 1 are replaced by networks 902, 904, and 906. Beginning with network 902, measurement beam 105 and reference beam 107 couple from mirror 114, shown in FIG. 1, to the polarization sensitive beamsplitter 908. Being initially S-polarized, the diagonal interface 908a reflects the reference beam 107 to a second polarization sensitive beamsplitter 912. The diagonal interface 912a of beamsplitter 912 reflects the S-polarized reference beam 107 through the quarter wavelength plate 124 and along path 914 to the stationary reference mirror 126. As the quarter wavelength plate 124 passes the reference beam 107, it rotates the beam to be circularly polarized. After reflection from mirror 126, the beam 107 then passes back through the quarter wavelength plate 124, which rotates beam 107 to be P-polarized. Being P-polarized, beam 107 passes through diagonal interface 912a to corner cube 916. The corner cube 916 couples beam 107 back to beamsplitter 912, along path 918. With beam 107 P-polarized, it passes through diagonal interface 912a to quarter wavelength plate 124. Quarter wavelength plate 124 rotates beam 107 to be circularly polarized and passes it to mirror 126. Mirror 126 reflects beam 107 back along path 918. Quarter wavelength plate 124 rotates beam 107 to be S-polarized and passes the beam to diagonal interface 912a. With beam 107 being S-polarized, diagonal interface 912a reflects beam 107 to diagonal interface 908a, which likewise reflects beam 107 back to mirror 114. In this way, the reference beam 107 traverses the reference path 112 four times.

Figure 3:
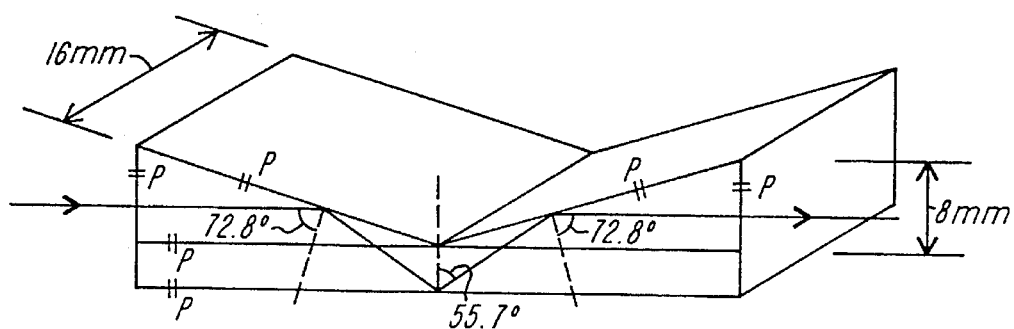
FIG. 3 shows a schematic diagram of an exemplary custom quarter wavelength rhomb of the type depicted in FIG. 1.
Figure 4:
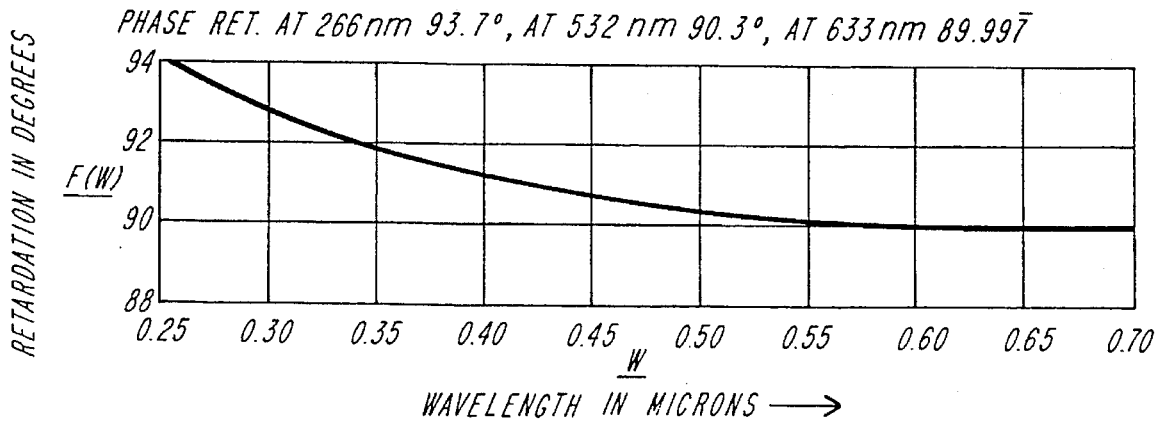
FIG. 4 is a graphical representation of the phase retardation versus wavelength characteristics for the rhomb depicted in FIG. 3.

Similarly, being initially P-polarized, the beamsplitter 908 couples the measurement beam 105, through diagonal interface 908a, to a third polarization sensitive beamsplitter 910. The beamsplitter 910 passes the beam 105, through diagonal interface 910a, along the measurement path 110. The polarization sensitive beamsplitter 910 can operate in concert with the corner cube 920, the quarter wavelength plate 118, and the moveable measurement mirror 120 to pass the measurement beam 105 along the measurement path 110 a plurality of times, much in the same way as described above, with regard to the reference beam. Optionally, measurement beam 105 can also couple through a quarter wavelength plate 922, which is similar in construction to plate 124, to provide for additional polarization adjustment. Also, as previously mentioned with regard to FIG. 1, plates 118, 124, and 105 can also be constructed as quarter wavelength rhombs, as shown in FIGS. 3 and 4. Element 932 can be constructed to be essentially transparent to the measurement beam 105.

One significant advantage of configuration 900 is that it enables the designer to employ high quality glass and fused silica, rather than the more costly calcite, used in the construction of configuration 100. Another advantage is that the placement of two polarization beamsplitters in series, such as in the case of elements 908 and 912 and elements 908 and 910, improves the polarization separation efficiency so that polarization cross-talk is minimized. By way of example, polarization separation is a product of the efficiency for each beamsplitter. Thus, if a single element permits 3% polarization leakage, two such elements in series only allows 0.09% leakage. Errors due to optical nonlinearity are directly proportional to the degree of polarization leakage. Therefore, such a configuration can reduce the nonlinearity errors by a factor of thirty.

This improvement is significant and difficult to achieve in a single polarization sensitive beamsplitter, such as that depicted in FIG. 1. The polarization separation is typically dependent on the thin film coating used at the diagonal interface. It is difficult to design a single coating that can be reproducibly fabricated and that provides clean separation along both orthogonal beam paths.

Regarding the particular components employed in network 902, the corner cubes 916 and 920 are model #10703A, available from Hewlett Packard. The polarization sensitive beamsplitters 908, 910, and 912 are model #10766A, available from Hewlett Packard. The quarter wavelength plate 922 is a model #10722A, available from Hewlett Packard; and plates 124 and 118 are identical to those shown in FIG. 1.

As previously discussed, it is an important goal of the present invention to provide an interferometric measurement device with improved air turbulence compensation. The air turbulence effects typically experienced in most circumstances, where a vacuum is not permitted, usually greatly exceed the nonlinearity effects, and therefore, they are given little concern. However, the present invention has the capability of precisely compensating for air turbulence effects. Consequently, the remaining errors related to optical nonlinearity provide a major component of the remaining uncertainty. Additionally, it should be noted that the arrangement of network 902 can nevertheless, be used to reduce polarization leakage and improve nonlinearity errors in many types of interferometric measurement systems, including those that do not incorporate air turbulence compensation.

Turning to networks 904 and 906, they function much in the same way as elements 116 and 130 in FIG. 1. As in the case of FIG. 1, and also in the case of the measurement beam 105, the detection beams 142 and 144 traverse the measurement path (i.e., the path between wave plate 924 and movable mirror 120) four times (i.e., twice in each direction). More particularly, the 266 nm (UV) beam 142 and the 532 nm (green) beam 144 couple from the doubler 136 of FIG. 1 to the wave plate 924. Coming from the doubler 136, the beams 142 and 144 may be orthogonally polarized with respect to each other. However, wave plate 924 acts as a half wavelength plate with respect to beam 142 and a full wavelength plate with respect to beam 144 and thus, rotates those beams to be identically polarized. For convention sake, we will assume beams 142 and 144 are P-polarized upon passing through plate 924. However, as those skilled in the art will be appreciate, both beams can as easily be S-polarized.

Wave plate 924 couples detection beams 142 and 144 to dual wavelength polarization sensitive beamsplitter 926 along path 936. The beamsplitter 926 is capable of either passing or reflecting beams 142 and 144, based on whether those beams are S- or P-polarized. Unlike the polarization sensitive beamsplitters of network 902, which are required to split two closely spaced laser frequencies having crossed polarizations, the beamsplitter 926 is required to operate identically on two widely spaced wavelengths (e.g., 266 nm and 532 nm) having identical polarization. This is because beams 142 and 144 traverse the same optical path, and the relative reference in the system is the relationship of one wavelength to the other. Consequently, the polarization separation at beamsplitter 926 is not related to any optical linearity errors. Therefore, the efficiency of beamsplitter 926 is most important for maintaining a low loss beam direction scheme. For ease of design, beamsplitter 926 is constructed with an angle of incidence of 53 degrees, as opposed to the more typical 45 degrees. Operation at 53 degrees is beneficial, with some capacity for angle tuning to provide the best performance, because it is near Brewster's angle.

Being initially P-polarized, the beamsplitter 926 passes beams 142 and 144 to the right angle prism 928 along path 938. Unlike the corner cube retroreflectors 916 and 920 of network 902, networks 904 and 906 employ right angle prisms. In network 902, the corner cubes 916 and 920 pass red light and can thus, be constructed from BK7. However, BK7 is not suitable for the required UV transmission of networks 904 and 906. Instead, materials such as fused silica are more suitable. The lower refractive index available from fused silica supports internal reflection with low absorption losses, but only at angles up to about 46 degrees. The result is that a corner cube configuration (which uses three reflections) does not work. However, a right angle prism (which uses two reflections near 45 degrees) works well. Therefore, the preferred retroreflector for networks 904 and 906 is a right angle prism of fused silica with a high reflection efficiency, such as model #01PQB002, available from Melles Griot Inc.

The right angle prism 928 reflects beams 142 and 144 to dichroic beamsplitter 930 along path 940. Beamsplitter 930 reflect beams 142 and 144 to dichroic beamsplitter 932 along path 942. Beamsplitters 930 and 932 employ dielectric thin film coatings, designed to reflect the UV and green frequencies of beams 142 and 144, while passing the measurement beam 105. According to one preferred embodiment the measurement beam is generated by a HeNe laser source 106 and is therefore, a red beam. The beamsplitters 930 and 932 are used in series to provide efficient reflection of beams 142 and 144, as well as improved separation of the HeNe wavelengths from the UV and green wavelengths to avoid undesirable cross-talk. Beamsplitter 932 reflects beams 142 and 144 to the quarter wavelength plate (or rhomb) 118 along path 944. The plate 118 can be designed to operate at all three wavelengths (UV, green, and red). However, it is possible to introduce a second quarter wavelength plate 922 to provide an extra adjustment capability at the HeNe wavelength. This can be advantageous when consideration is given to creating a three wavelength quarter wavelength plate, where precise retardation at the HeNe wavelength may be difficult to provide reproducibly.

Beams 142 and 144 pass through plate 118 to measurement mirror 120. As they do so, plate 118 rotates beams 142 and 144 to be circularly polarized. Mirror 120 reflects the beams 142 and 144 back along path 944. Beams 142 and 144 pass back through plate 118, which rotates them to be S-polarized. The beams 142 and 144 then couple back to polarization sensitive beamsplitter 926, by way of elements 932, 930, and 928, and path 938. Being S-polarized, beamsplitter 926 reflects beams 142 and 144 to right angle prism 934, which reflects beams 142 and 144 back to the beamsplitter 926 by way of path 946. With the beams 142 and 144 still S-polarized, the beamsplitter 926 reflects them to prism 928 along path 948. Prism 928 reflects beams 142 and 144 to beamsplitter 930, which in turn couples the beams to beamsplitter 932. Beamsplitter 932 couples beams 142 and 144, along path 950, through plate 118, which rotates them to be circularly polarized. The beams 142 and 144 are then reflected back along path 150 from mirror 120. The circularly polarized beams pass back through plate 118, becoming P-polarized. Beams 142 and 144 are then reflected back to beamsplitter 926, by way of elements 932, 930, and 928, and path 948. Being P-polarized, beamsplitter 926 passes beams 142 and 144 back to wave plate 924. Plate 924 rotates beams 142 and 144 to be once again orthogonally polarized with respect to each other, and then couples them, as beams 146 and 148, to the SHI sensor 138 of FIG. 1.

As those skilled in the art will appreciate, an interferometric system of the type depicted in FIGS. 1 and 11–14 is dimensionally sensitive. Thus, it is advantageous to construct the measurement path 110 and the reference path 112 as symmetrical as practical. According to a preferred embodiment, the dimensions of the polarization sensitive beamsplitters are virtually identical, and the number of reflections in the measurement and reference paths are the same. The "deadpath" associated with the turbulent detection optics, such as element 932 and possibly element 922, can be compensated for by lengthening the reference path 112 to match this deadpath, as well as by adding thick fused silica flats to mimic the thickness of the deadpath optics. This enables the system of FIGS. 1 and 11–14 to directly compensate for uniform thermal changes, which may affect the dispersion of the optical elements and therefore, the stability of the air turbulence detection subsystem.

As discussed above, the embodiment of FIG. 1 detects atmospheric disturbances in the measurement path 110 by measuring the phase difference between two beams 142 and 144, which results when beams 142 and 144 are simultaneously projected along the path 110. However, as is discussed below, according to other embodiments of the present invention, several other approaches can be employed to detect such disturbances.

FIG. 12 is a schematic block diagram depicting an interferometer 400 which includes an alternate embodiment of the compensation network 104 of FIG. 1. As in the case of the system 100 of FIG. 1, the interferometer 400 can measure changes in the position of the measurement mirror 402 relative to the stationary reference mirror 404, while concurrently compensating for atmospheric turbulence along the measurement beam path 406. As explained in further detail below, the interferometer 400 can optionally include a sensor 438 to enable it also to compensate for atmospheric disturbances along the reference beam path 408. Thus, according to one embodiment of FIG. 12, neither the measurement path 406 nor the reference path 408 need be environmentally controlled.

Unlike the embodiment of FIG. 1, the interferometer 400 employs a single light source 410 which provides both the measurement beams and the atmospheric disturbance detection beams. According to one preferred embodiment, the light source 410 is a heterodyne light source comprising, for example, a diode pumped doubled YAG laser (DPDYAG). The light beams from such a source can also be frequency stabilized relative to a standard, such as iodine vapor, for further enhancement in stability. Alternatively, reference can be made to a fixed dimension stabilizing device.

The pair of heterodyne laser beams 412 generated by laser 410 are frequency doubled by the frequency doubler 414. Following frequency doubling, the two heterodyne beam pairs 416 and 418 pass through the interferometer system, traversing both the reference beam path 408 and the measurement beam path 406. More particularly, the mirror 420 couples beam pairs 416 and 418 to the polarization sensitive beamsplitter 422. The polarization sensitive beamsplitter 422 directs one beam 416a of the undoubled heterodyne pair 416 to the reflector 424 and the other beam 416b of the undoubled pair 416 to the quarter wavelength rhomb 426. Similarly, the beamsplitter 422 directs one beam 418a, of the frequency doubled heterodyne pair 418, to the reflector 424, and the other beam 418b, of the frequency doubled pair 418, to the quarter wavelength rhomb 426. The reflector 424 directs the beams 416a and 418a through the quarter wavelength rhomb 428 and along the reference path 408 to the stationary reference mirror 404. Likewise, the beams 416b and 418b propagate through the rhomb 426 and along the measurement path 406 to the variable position mirror 402.

The undoubled heterodyne pair, beams 416a and 416b, reflect back along the reference and measurement paths, respectively, to the mirror 420 which reflects the pair of beams 416 to the dichroic beamsplitter 430. The dichroic beamsplitter 430 reflects the pair of beams 416 to the heterodyne sensor 432. The sensor 432 can determine the change in position of mirror 402 relative to the mirror 404 in the same fashion as sensor 128 of FIG. 1. Like the undoubled heterodyne pair 416, the doubled heterodyne pair 418, after traversing the same respective optical elements as the undoubled pair 416, passes through the dichroic beamsplitter 430, where it is coupled to the frequency doubled heterodyne sensor 434. The sensor 434 can determine the relative change in position between mirror 402 and mirror 404 in the same manner as sensor 432. As in the network 102 of FIG. 1, the corner cube 427 can operate in conjunction with the polarization sensitive beamsplitter 422 and the rhomb 426 to reflect the beams 416b and 418b along the measurement path 406 a predetermined number of times before coupling the reflected beams back to the mirror 420. As one skilled in the art will appreciated, the corner cube 427 and the beamsplitter 422 can also operate in concert with rhomb 428 to reflect the beams 416a and 418a along the reference path 408 a predetermined number of times before coupling those beams back to the mirror 416.

If both the reference path 408 and the measurement path 406 are maintained in vacuum, the change in mirror position determined by sensors 432 and 434 would be the same. However, if one path is not evacuated or at least not environmentally controlled, comparison between the optical path lengths measured at the two widely separated frequencies of beams 416 and 418 can provide an accurate measurement of the fluctuations caused by the dispersion along the uncontrolled path. These fluctuations can then be subtracted out to provide an accurate measurement of the change in relative position between the two mirrors 402 and 404.

As mentioned above, the system 400 can optionally include a sensor 438, According to one embodiment, sensor 438 can be a second harmonic interferometric sensor, much like sensor 138 of FIG. 1. According to such an embodiment, the mirror 420 couples the reflected beam pairs 416 and 418 to a partially silvered mirror 436. The mirror 436 in turn couples the pairs 416 and 418 to the sensor 438. As in the case of the sensor 138, the sensor 438 can process the frequency doubled beam 418b and the undoubled beam 416b, which are reflected from the measurement path 406, to determine any atmospheric related path length fluctuations along that path. Alternatively, the sensor 438 can process the frequency doubled beam 418a and the undoubled beam 416a, which are reflected from the reference path 408 to determine any atmospheric related path length fluctuations along that path. Thus, an important advantage of this embodiment is that any time varying dispersion fluctuations present in either the measurement path or the reference path can be directly measured. In this way, the expense and technical complexity of atmospherically controlling either path can be avoided.

Figure 13:
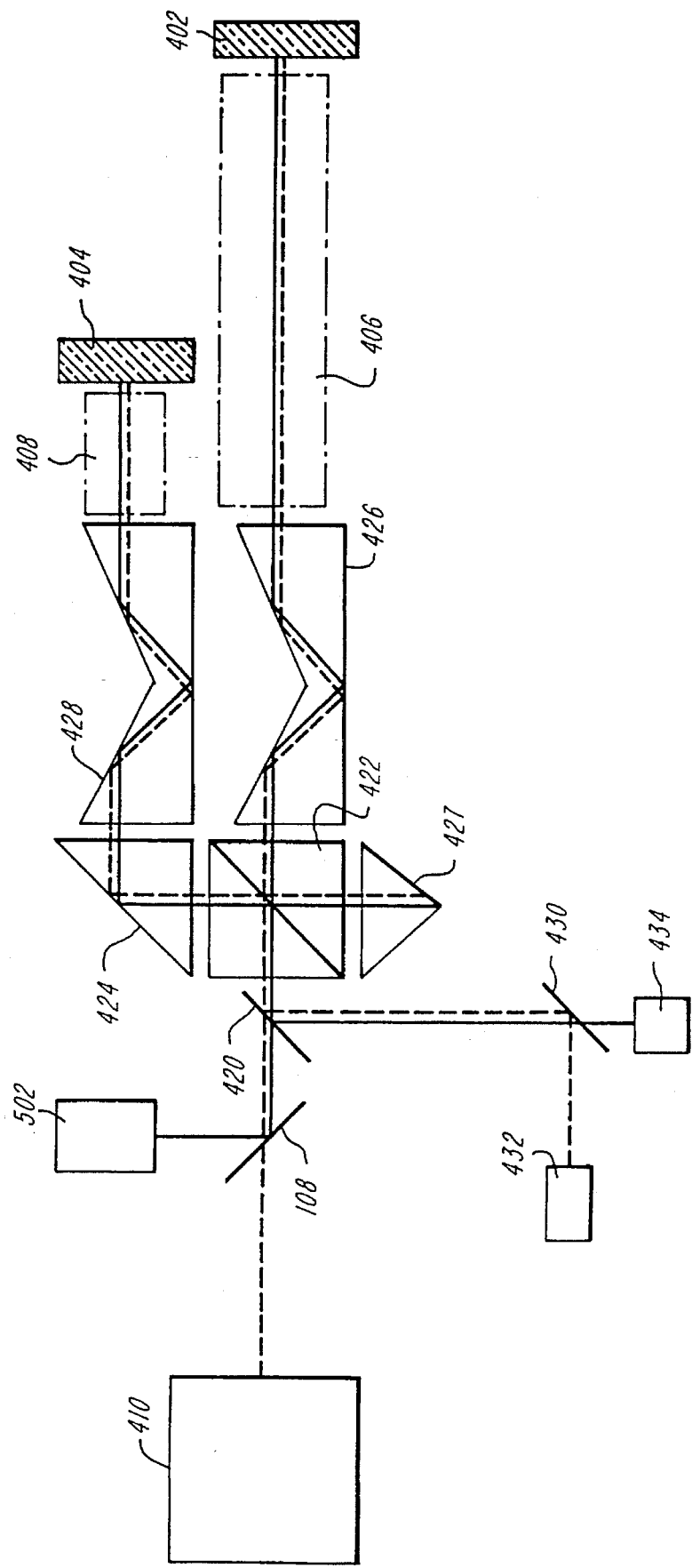
FIG. 13 is a schematic block diagram depicting an interferometric measurement system incorporating an air turbulence compensation network, which utilizes two heterodyne laser sources that are well separated in wavelength.

FIG. 13 is a schematic block diagram depicting an alternate embodiment 500 which utilizes an additional laser source 502 instead of the frequency doubler 414 of FIG. 12. The wavelengths provided by the second laser source 502 are well separated from those of the first laser 410. But for the substitution of the doubler 414 with the source 502, the operation of the interferometer 500 is virtually identical to the operation of the interferometer 400 of FIG. 12.

Figure 14:
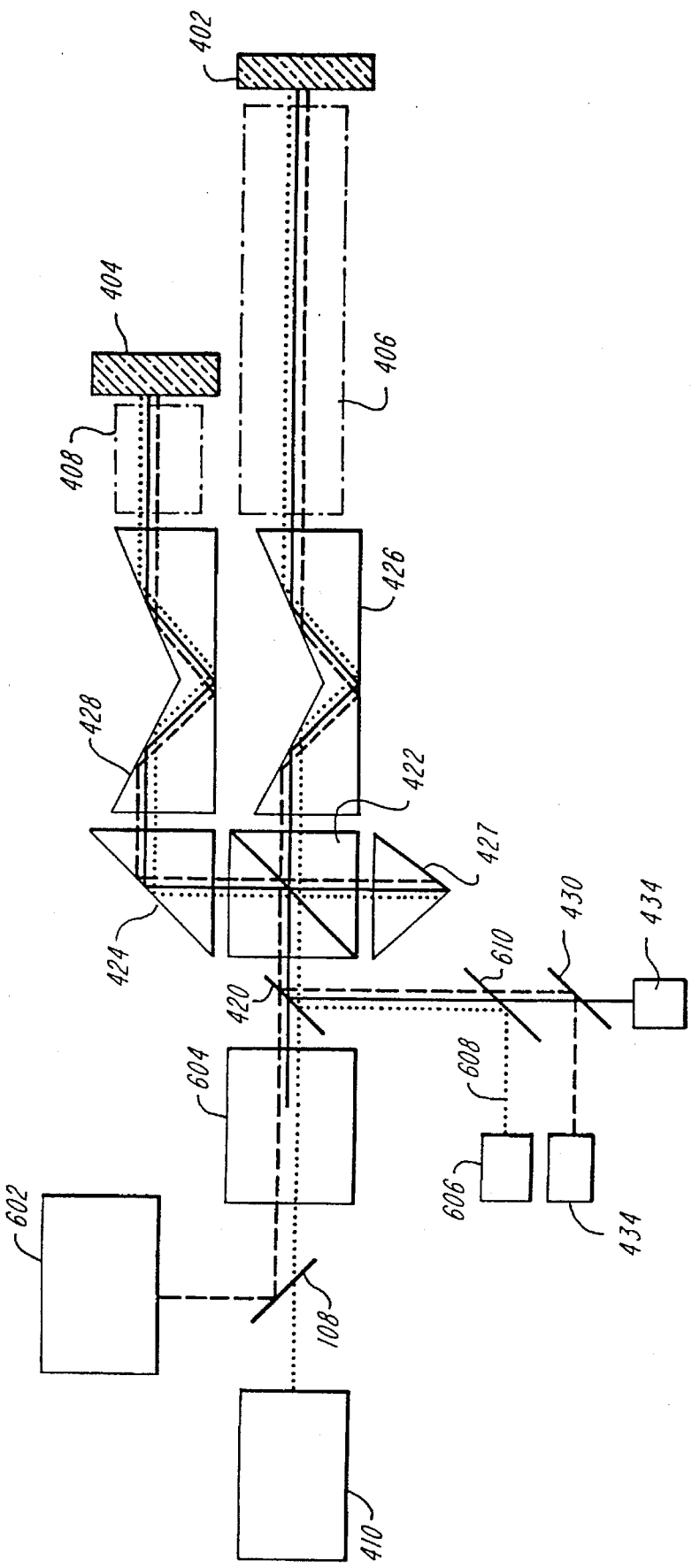
FIG. 14 is a schematic block diagram of an interferometric measurement system incorporating an air turbulence compensation network, which uses two heterodyne laser sources, of which one is especially stable and the other is frequency doubled.

FIG. 14 is a schematic block diagram depicting another variation 600 of the embodiment 400 of FIG. 12. As illustrated in that figure, the interferometer 600 includes both a second heterodyne laser source 602 and a frequency doubler 604. Since the frequency doubler 604 provides the two well separated beams which perform the atmospheric disturbance detection/compensation, the frequency of the second heterodyne laser need not be well separated from the frequency of the first heterodyne laser. The interferometer 600 also includes an additional heterodyne sensor 606 for receiving the heterodyne beam pair 608 reflected from paths 406 and 408 and coupled through beamsplitter 610. One advantage of the system of FIG. 14 is that the sensor 438 need not be used. Another advantage is that the second heterodyne laser 602 need not be highly wavelength stabilized.

Figure 15:
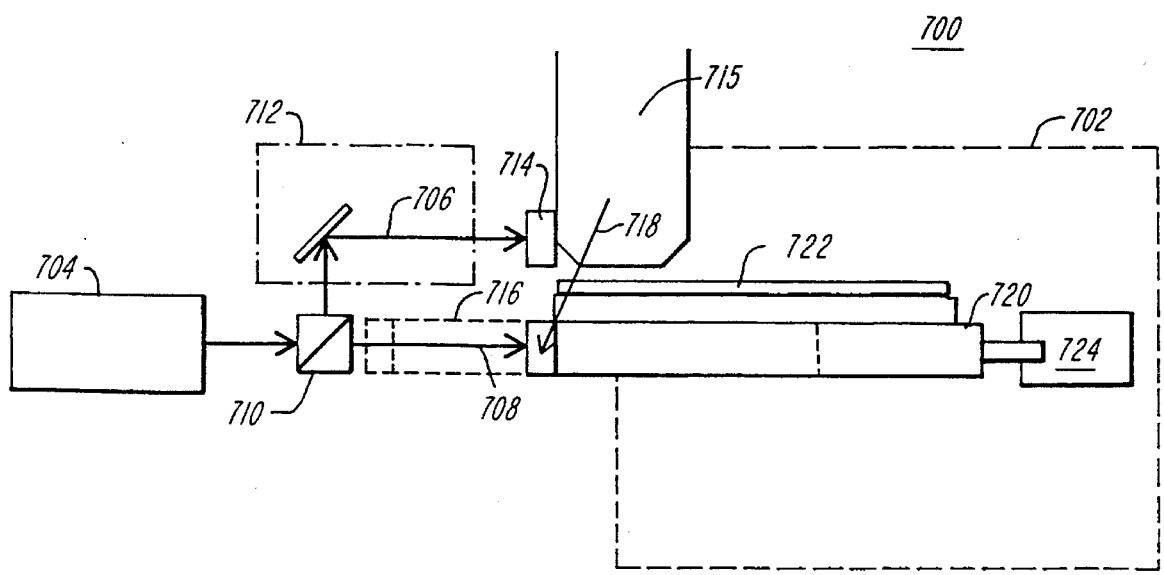
FIG. 15 is a schematic block diagram of an interferometric measurement system according to the invention, incorporated into an apparatus used for integrated circuit fabrication.

FIG. 15 is a schematic block diagram depicting an interferometric system 700, of the type illustrated in FIGS. 1, and 11–14, adapted for operation with a stepper system 702. The system 700 includes a laser source and sensor 704 for generating a reference beam 706 and a measurement beam 708. The optical network 710 couples the reference beam 706 along a reference path 712 to a stationary reference mirror 714 having an associated reduction lens 715. Similarly, the network 710 couples the measurement beam 708 along a measurement path 716 to a movable measurement mirror 718. The measurements mirror 718 mounts on a movable stage 720, which holds a silicon wafer 722. As indicated the reference path 712 is shielded from environmental turbulence, while the measurement path 716 is left unprotected.

Typically, the interferometric system 700 controls a stage drive servo motor 724 which precisely positions the stage 720. More particularly, a plurality of interferometric measuring devices are employed to provide x-, y-, and z-axial control, along with rotational control of the lithographic stage 703. As with any electrical components, the servo motors and their associated controller electronics generate heat. The heat in turn causes atmospheric disturbances along the optical measurement paths, and if environmentally uncontrolled, the various optical reference paths, in the interferometric position controllers. As discussed above, these disturbances result in positioning errors. Such positioning errors result in circuit registration errors which are intolerable in modern integrated circuit fabrication applications. Since the system 700 can compensate for optical path length variations due to atmospheric disturbance, concurrently with performing the necessary distance measurements to accurately position the stage 720, it can control the positioning of the stage 720 far more accurately than any prior art controllers. Thus, the interferometric system 700 can operate as a key component in a commercial high performance stepper system.

As one skilled in the art will appreciate, the illustrative constructions and design details (including all exemplary part number designations) provided above for a heterodyne interferometric measurement system according to the invention may be modified without departing from the scope of the invention. For example, various approaches can be employed to provide frequency doubling of the laser beams. By further example, several and various interferometer designs can be implemented using a variety of optical components to measure displacements, with single, double, quadruple and more beam paths used to achieve higher accuracy. By further example, enhanced designs of electronic detection systems can be used to measure more accurately position changes. Furthermore, the time dependent positional information can be used to determine the most accurate position by means of advanced computer algorithms.

It is accordingly intended that all matter contained in the above description or shown in the accompanying drawings be interpreted as illustrative rather than in a limiting sense.

It is also intended that the following claims cover all of the generic and specific features of the invention as described herein, and all statements of the scope of the invention which, as a matter of language, might be said to fall therebetween.

Having described the invention, what is claimed as new and secured by Letters Patent is:

1. An interferometric measuring system comprising:
    a first laser source including means for projecting a reference light beam at a first measurement wavelength along a reference path to a reference reflector, and means for projecting a measurement light beam at a second measurement wavelength along a measurement path to a measurement reflector;
    position measurement means for determining a change in position of said measurement reflector from an interference pattern produced between a reflected reference beam from said reference reflector and a reflected measurement beam from said measurement reflector wherein said means for projecting said measurement light beam includes means for directing said measurement light beam along said measurement path a plurality of times, prior to coupling said reflected measurement beam to said position measurement means;
    a second laser source including means for projecting a first detection beam at a first detection wavelength along said measurement path, and means for projecting a second detection beam at a second detection wavelength along said measurement path;
    a sensor including means for measuring a phase difference between a first reflected detection beam reflected from said measurement reflector due to said first detection beam and a second reflected detection beam reflected from said measurement reflector due to said second detection beam, wherein said phase difference is indicative of atmospheric disturbances along said measurement path; and
    means for compensating for errors in determining said change in position of said measurement reflector, wherein said errors result at least in part from said atmospheric disturbances.

2. An interferometric measuring system according to claim 1, wherein said first measurement frequency is equal to said second measurement frequency, and said means for determining a change in position of said measurement reflector comprises,
    a detector including means for combining said reflected reference beam and said reflected measurement beam, and means for generating an electrical signal representative of said interference pattern, and
    first processor means for counting fringes in said electrical signal, wherein said fringes result from said reflected reference beam and said reflected measurement beam alternately interfering constructively and destructively, to determine said change of position of said measurement reflector.

3. An interferometric measuring system according to claim 2 wherein said second laser source includes a diode laser for generating said first detection beam, wherein said first detection wavelength is substantially different from said first measurement wavelength.

4. An interferometric measuring system according to claim 2 wherein said means for projecting said second detection beam includes a first wavelength shifter having means for generating said second detection beam at said second detection wavelength, wherein said second detection wavelength is approximately one half said first detection wavelength.

5. An interferometric measuring system according claim 2 wherein said sensor comprises:
    a beam director including means for directing said first reflected detection beam along a first optical path and means for directing said second reflected detection beam along a second optical path;
    a wavelength shifter located in said first optical path and including means for shifting said first detection wavelength to be substantially equal to said second detection wavelength; and
    a photosensitive detector located in said second optical path and coupled to said wavelength shifter and including means for determining a difference in phase angle between said first reflected detection beam and said second reflected detection beam, subsequent to said first reflected detection beam being wavelength shifted.

6. An interferometric measuring system according to claim 5 wherein said first optical path has a nominal first optical path length and said second optical path has a nominal second optical path length, and wherein said sensor comprises an optical path modulator located in at least one of said first optical path and said second optical path and including means for modulating at least one of said first optical path length and said second optical path length.

7. An interferometric measuring system according to claim 6 wherein said optical path modulator includes a piezoelectric device.

8. An interferometric measuring system according to claim 6 wherein said beam director includes a wavelength selective beamsplitter including means for directing said first reflected detection beam along said first optical path to said optical path modulator and means for directing said second reflected detection beam along said second optical path.

9. An interferometric measuring system according to claim 6 wherein said beam director includes a polarization selective beamsplitter including means for directing said first reflected detection beam along said first optical path to said optical path modulator and means for directing said second reflected detection beam along said second optical path.

10. An interferometric measuring system according to claim 5 wherein said second detection wavelength is approximately one half said first detection wavelength, and said wavelength shifter includes means for halving said first detection wavelength to render said first detection wavelength substantially equal to said second detection wavelength.

11. An interferometric measuring system according to claim 5 wherein said sensor includes counting means for determining said phase difference from counting optical fringes resulting from an interference pattern produced from combining said first reflected detection beam with said second reflected detection beam, subsequent to said first reflected detection beam being wavelength shifted.

12. An interferometric measuring system according to claim 5 wherein said detector includes means for generating an electrical signal indicative of said difference in said phase angle.

13. An interferometric measuring system according to claim 12 wherein said electrical signal includes a plurality of harmonic signals, and said sensor includes:
  a first plurality of lock-in amplifiers coupled to said electrical signal and including means for isolating a first set of said harmonic signals, and also including means for generating a first set of output signals indicative of each of said first set of said harmonic signals, and
  second processor means for processing said first set of output signals to determine at least a first portion of said difference in said phase angle.

14. An interferometric measuring system according to claim 13 wherein said sensor includes:
  a second plurality of lock-in amplifiers coupled to said electrical signal and including means for isolating a second set of said harmonic signals, and including means for generating second set of output signals indicative of said second set of said harmonic signals, and
  a sampling network, coupled to said second set of output signals from said second plurality of lock-in amplifiers, and including means for periodically sampling said second set of output signals, and means for processing said sampled signals to determine a second portion of said difference in said phase angle.

15. A system according to claim 1 wherein said sensor includes compensation means for compensating at least portions of said sensor for uniform changes in temperature.

16. A system according to claim 15 wherein said compensation means includes means for enclosing at least a portion of said sensor in a gas-tight chamber.

17. A system according to claim 15 wherein said compensation means includes a base plate having channels for said first and said second detection beams.

18. A system according to claim 1 wherein said sensor includes an assembly for manipulating said first reflected detection beam and said second reflected detection beam, said assembly comprising:
  a first beamsplitter, characterized by first temperature dependent indices of refraction, mounted on said base plate at a first point, and having means for directing said first reflected detection beam from said first point along a first optical path, and means for directing said second reflected detection beam from said first point along a second optical path, different from said first optical path;
  a first reflector, mounted on said base plate in said first optical path, and having means for reflecting said first reflected detection beam from said first optical path along a third optical path;
  a second reflector, mounted on said base plate in said second optical path, and having means for reflecting said second reflected detection beam from said second optical path along a fourth optical path, wherein said fourth optical path intersects said third optical path at a second point;
  a second beamsplitter, characterized by second temperature dependent indices of refraction, mounted on said base plate at said second point, and having means for collinearly directing said first reflected detection beam from said third optical path and said second reflected detection beam from said fourth optical path along a fifth optical path; and
  temperature compensation means for compensating said assembly for uniform changes in temperature.

19. A system according to claim 18 wherein said temperature compensation means further comprises a base plate having a particular thermal coefficient of expansion and
  wherein dimensions of said first beamsplitter and said second beamsplitter and distances between said first beamsplitter, said second beamsplitter, said first reflector and said second reflector are selected such that said thermal coefficient of expansion of said base plate, and said first and second indices of refraction are balanced to render said assembly substantially impervious to uniform changes in temperature.

20. A system according to claim 19 wherein said temperature compensation means further comprises one or more channels in said base plate through which any one of said first and said second detection beams propagate.

21. A system according to claim 19 wherein said first beamsplitter, said second beamsplitter, said first reflector, and said second reflector are positioned on said base plate such that said first point and said second point are equidistant from a point on said first reflector where said first beam of light falls incident, and also equidistant from a point on said second reflector where said second beam of light falls incident.

22. A system according to claim 18 wherein said temperature compensation means further comprises means for enclosing said assembly in a gas-tight chamber.

23. A system according to claim 1 wherein said means for projecting said reference light beam further comprises means for directing said reference light beam along said reference path a plurality of times, prior to coupling said reflected reference beam to said means for determining said change in position.

24. A system according to claim 1 wherein said means for projecting said first detection beam and said means for projecting said second detection beam further comprises means for directing said detection beams along said measurement path a plurality of times, prior to coupling said first reflected detection beam and said second reflected detection beam to said sensor.

25. A system according to claim 1 wherein,
said means for projecting said reference light beam further comprises means for directing said reference light beam along said reference path a plurality of times prior to coupling said reflected reference beam to said means for determining said change in position, and
said means for projecting said first detection beam and said means for projecting said second detection beam further comprises means for directing said detection beams along said measurement path a plurality of times prior to coupling said first reflected detection beam and said second reflected detection beam to said sensor.

26. A system according to claim 1, wherein said reference light beam has any of a first polarization and a second polarization, said reference path has a first portion and a second portion, said reference reflector includes means for rotating said reference light beam from having said first polarization to having said second polarization and for rotating said light beam from having said second polarization to having said first polarization, wherein said means for projecting said reference light beam comprises a first optical network for passing said reference light beam along said reference path a plurality of times, said first optical network including,
means for projecting said reference light beam along said first portion of said reference path at said first polarization,
means for projecting said reference light beam along said second portion of said reference path at said second polarization, subsequent to said reference light beam being reflected from said reference reflector along said first portion of said reference path, and
means for coupling said reflected reference beam to said position measurement means, subsequent to said reference light beam being reflected from said reference reflector along said second portion of said reference path.

27. A system according to claim 26, wherein said measurement light beam has any of said first polarization and said second polarization, said measurement path has a first portion and a second portion, said measurement reflector includes means for rotating said measurement light beam from having said first polarization to having said second polarization and for rotating said light beam from having said second polarization to having said first polarization wherein,
means for projecting said measurement light beam along said first portion of said measurement path at said second polarization,
means for projecting said measurement light beam along said second portion of said measurement path at said first polarization, subsequent to said measurement light beam being reflected from said measurement reflector along said first portion of said measurement path, and
means for coupling said reflected measurement beam to said position measurement means, subsequent to said measurement light beam reflected from said measurement reflector along said second portion of said measurement path.

28. A system according to claim 26 wherein said first detection beam and said second detection beam have any of a first polarization and a second polarization, said measurement path has a first portion and a second portion, said measurement reflector includes means for rotating said first detection beam and said second detection beam from having said first polarization to having said second polarization and from having said second polarization to having said first polarization, and wherein said means for projecting said first detection beam and said means for projecting said second detection beam further comprises an optical network for projecting said first detection beam and said second detection beam along said measurement path a plurality of times, said optical network including,
means for projecting said first detection beam and said second detection beam along said first portion of said measurement path at said first polarization,
means for projecting said first detection beam and said second detection beam along said second portion of said measurement path at said second polarization, subsequent to said first detection beam and said second detection beam being reflected from said measurement reflector along said first portion of said measurement path, and
means for coupling said first detection beam and said second detection beam to said sensor, subsequent to said first detection beam and said second detection beam being reflected from said measurement reflector along said second portion of said measurement path.

29. A system according to claim 1, wherein said reference light beam has any of a first polarization and a second polarization, said reference path has a first portion and a second portion, said reference reflector includes means for rotating said reference light beam from having said first polarization to having said second polarization and for rotating said light beam from having said second polarization to having said first polarization, wherein said means for projecting said reference light beam comprises a first optical network for passing said reference light beam along said reference path a plurality of times, said first optical network including,
a first polarization sensitive beamsplitter having means for directing said reference light beam from said first laser source along said first portion of said reference path in response to said reference light beam having said first polarization, and means for directing said reference light beam reflected from said reference reflector along said second portion of said reference path to said position measurement means, in response to said reference light beam reflected from said reference reflector having said first polarization,
second polarization sensitive beamsplitter having means for directing said reference light beam from said first polarization sensitive beamsplitter to said reference reflector along said first portion of said reference path in response to said reference light beam having said first polarization, means for directing said reference light beam reflected from said reference reflector along said second portion of said reference path to said first polarization sensitive beamsplitter in response to said reference light beam reflected from said reference reflector having said first polarization, and means for passing said reference light beam reflected from said reference reflector through said second polarization sensitive beamsplitter in response to said reference light beam reflected from said reference reflector having said second polarization,
first polarization rotator means, located in said first and second portions of said reference path between said second polarization sensitive beamsplitter and said reference reflector, for rotating said reference light beam from having said first polarization to having said second polarization and for rotating said reference light beam from having said second polarization to having said first polarization, and first retroreflector means for directing said reference light beam reflected from said reference reflector, having said second polarization and passed from said first polarization sensitive beamsplitter along said first portion of said reference path, back to said first polarization sensitive beamsplitter, along said second portion of said reference path.

30. A system according to claim 29, wherein said measurement light beam has any of said first polarization and said second polarization, said measurement path has a first portion and a second portion, said measurement reflector includes means for rotating said measurement light beam from having said first polarization to having said second polarization and for rotating said light beam from having said second polarization to having said first polarization wherein, said first polarization sensitive beamsplitter further includes means for directing said measurement light beam from said first laser source along said first portion of said measurement path, in response to said measurement light beam having said second polarization, means for directing said measurement light beam reflected from said measurement reflector along said second portion of said measurement path to said position measurement means in response to said measurement light beam reflected from said measurement reflector having said second polarization, and wherein said means for projecting said measurement light beam further comprises a second optical network for passing said measurement light beam along said measurement path a plurality of times, said second optical network including, second retroreflector means for redirecting a light beam from said first portion of said measurement path to said second portion of said measurement path, a third polarization sensitive beamsplitter located in said first and second portions of said measurement path, and including means for directing said measurement light beam from said first polarization sensitive beamsplitter to said measurement reflector along said first portion of said measurement path, in response to said measurement light beam having said second polarization, means for directing said measurement light beam reflected from said measurement reflector along said first portion of said measurement path to said second retroreflector means in response to said measurement light beam reflected from said measurement reflector having said first polarization, means for directing said measurement light beam reflected from said measurement reflector and coupled through said second retroreflector means along said second portion of said measurement path to said measurement reflector in response to said measurement light beam reflected from said measurement reflector having said first polarization, and means for directing said measurement light beam reflected from said measurement reflector along said second portion of said measurement path to said second polarization sensitive beamsplitter, in response to said measurement light beam having said second polarization.

31. A system according to claim 30 wherein said second optical network further comprises second polarization rotator means, located in said measurement path between said third polarization sensitive beamsplitter and said measurement reflector, for rotating said measurement light beam from having said first polarization to having said second polarization and for rotating said measurement light beam from having said second polarization to having said first polarization.

32. A system according to claim 29 wherein said first measurement wavelength is substantially equal to said second measurement wavelength.

33. A system according to claim 1, wherein said measurement light beam has any of a first polarization and a second polarization, said measurement path has a first portion and a second portion, said measurement reflector includes means for rotating said measurement light beam from having said first polarization to having said second polarization and for rotating said measurement light beam from having said second polarization to having said first polarization, wherein said means for projecting said measurement light beam further comprises a first optical network for passing said measurement beam along said measurement path a plurality of times, said first optical network including, means for projecting said measurement light beam along said first portion of said measurement path with said second polarization, means for projecting said measurement light beam along said second portion of said measurement path with said first polarization, subsequent to said measurement light beam being reflected from said measurement reflector along said first portion of said measurement path, and means for coupling said reflected measurement beam to said position measurement means, subsequent to said measurement light beam being reflected from said measurement reflector along said second portion of said measurement path.

34. A system according to claim 33, wherein said reference light beam has any of a first polarization and a second polarization, said reference path has a first portion and a second portion, said reference reflector includes means for rotating said reference light beam from having said first polarization to having said second polarization and for rotating said reference light beam from having said second polarization to having said first polarization, wherein said means for projecting said reference light beam comprises a second optical network for passing said reference light beam along said reference path a plurality of times, said second optical network including, means for projecting said reference light beam along said first portion of said reference path with said first polarization, means for projecting said reference light beam along said second portion of said reference path with said second polarization, subsequent to said reference light beam being reflected from said reference reflector along said first portion of said reference path, and means for coupling said reflected reference beam to said position measurement means, subsequent to said reference light beam being reflected from said reference reflector along said second portion of said reference path.

35. A system according to claim 33 wherein said first detection beam and said second detection beam have any of a first polarization and a second polarization, said measurement path has a first portion and a second portion, said measurement reflector includes means for rotating said first detection beam and said second detection beam from having said first polarization to having said second polarization and from having said second polarization to having said first polarization, and wherein said means for projecting said first detection beam and said means for projecting said second detection beam further comprises an optical network for projecting said first detection beam and said second detection beam along said measurement path a plurality of times, said optical network including, means for projecting said first detection beam and said second detection beam along said first portion of said measurement path with said first polarization, means for projecting said first detection beam and said second detection beam along said second portion of said measurement path with said second polarization, subsequent to said first detection beam and said second detection beam being reflected from said measurement reflector along said first portion of said measurement path, and means for coupling said first detection beam and said second detection beam to said sensor, subsequent to said first detection beam and said second detection beam being reflected from said measurement reflector along said second portion of said measurement path.

36. A system according to claim 1, wherein said measurement light beam has any of a first polarization and a second polarization, said measurement path has a first portion and a second portion, said measurement reflector includes means for rotating said measurement light beam from having said first polarization to having said second polarization and for rotating said measurement light beam from having said second polarization to having said first polarization, wherein said means for projecting said measurement light beam further comprises a first optical network for passing said measurement beam along said measurement path a plurality of times, said first optical network including, first retroreflector means for redirecting a light beam from said first portion of said measurement path to said second portion of said measurement path, a first polarization sensitive beamsplitter located in said first and said second portions of said measurement path, and including means for directing said measurement light beam from said first laser source to said measurement reflector along said first portion of said measurement path, in response to said measurement light beam having said second polarization, means for directing said measurement light beam reflected from said measurement reflector along said first portion of said measurement path to said first retroreflector means in response to said measurement light beam reflected from said measurement reflector having said first polarization, means for directing said measurement light beam reflected from said measurement reflector and coupled through said first retroreflector means along said second portion of said measurement path back to said measurement reflector along said first portion of said measurement path in response to said reflected measurement light beam having said first polarization, and means for directing said measurement light beam reflected from said measurement reflector along said second portion of said measurement path to said position measurement means, in response to said measurement light beam reflected from said measurement reflector having said second polarization.

37. A system according to claim 36, wherein said reference light beam has any of said first polarization and said second polarization, said reference path has a first portion and a second portion, said reference reflector includes means for rotating said reference light beam from having said first polarization to having said second polarization and for rotating said reference light beam from having said second polarization to having said first polarization, wherein said means for projecting said reference light beam comprises a second optical network for passing said reference light beam along said reference path a plurality of times, said second optical network including, a second polarization sensitive beamsplitter having means for directing said reference light beam from said first laser source along said first portion of said reference path in response to said reference light beam having said first polarization, and means for directing said reference light beam reflected from said reference reflector along said second portion of said reference path to said position measurement means, in response to said reference light beam reflected from said reference reflector having said first polarization, a third polarization sensitive beamsplitter, having means for directing said reference light beam from said second polarization sensitive beamsplitter to said reference reflector along said first portion of said reference path in response to said reference light beam having said first polarization, means for directing said reference light beam reflected from said reference reflector along second portion of said reference path to said second polarization sensitive beamsplitter in response to said reference light beam reflected from said reference reflector having said first polarization, and means for passing said reference light beam reflected from said reference reflector in response to said reference light beam reflected from said reference reflector having said second polarization, first polarization rotator means, located in said first and second portions of said reference path between said third polarization sensitive beamsplitter and said reference reflector, for rotating said reference light beam from having said first polarization to having said second polarization and for rotating said reference light beam from having said second polarization to having said first polarization, and second retroreflector means for redirecting said reference light beam reflected from said reference reflector, having said second polarization and passed from said second polarization sensitive beamsplitter along said first portion of said reference path, back to said second polarization sensitive beamsplitter, along said second portion of said reference path.

38. A system according to claim 1 wherein said first detection beam and said second detection beam have any of a first polarization and a second polarization, said measurement path has a first portion and a second portion, said measurement reflector includes means for rotating said first detection beam and said second detection beam from having said first polarization to having said second polarization and from having said second polarization to having said first polarization, and wherein said means for projecting said first detection beam and said means for projecting said second detection beam further comprises an optical network for projecting said first detection beam and said second detection beam along said measurement path a plurality of times, said optical network including, means for projecting said first detection beam and said second detection beam along said first portion of said measurement path with said first polarization, means for projecting said first detection beam and said second detection beam along said second portion of said measurement path with said second polarization, subsequent to said first detection beam and said second detection beam being reflected from said measurement reflector along said first portion of said measurement path, and means for coupling said first detection beam and said second detection beam to said sensor, subsequent to said first detection beam and said second detection beam being reflected from said measurement reflector along said second portion of said measurement path.

39. A system according to claim 38 wherein said optical network further comprises, first polarization rotator means for adjusting said polarization of at least one of said first and said second detection beams received from said second laser source so that both of said first and said second detection beams have said first polarization and for coupling said first and said second detection beams having said first polarization along said first portion of said measurement path, and means for adjusting said polarization of at least one of said first and said second detection beams reflected from said measurement reflector along said second portion of said measurement path so that said first detection beam reflected from said measurement reflector has said first polarization and said second detection beam reflected from said measurement reflector has said second polarization and for coupling said first and said second detection beams from said second portion of said measurement path to said sensor, a first polarization sensitive beamsplitter including means for directing said first and said second detection beams from said first polarization rotator means to said measurement reflector along first portion of said measurement path in response to said first and said second detection beams having said first polarization, means for directing said first and said second detection beams reflected from said measurement reflector along said first portion of said measurement path to said second portion of said measurement path in response to said first and said second detection beams reflected from said measurement reflector having said second polarization, and means for directing said first and said second detection beams reflected from said measurement reflector along said second portion of said measurement path to said first polarization rotator means in response to said first and said second detection beams reflected from said measurement reflector having said first polarization, a first retroreflector optically coupled to said first polarization sensitive beamsplitter and including means for directing said first and said second detection beams reflected from said measurement reflector and received along said first portion of said measurement path from said first polarization sensitive beamsplitter back to said first polarization sensitive beamsplitter along said second portion of said measurement path, a second retroreflector optically coupled between said first polarization sensitive beamsplitter and said measurement reflector and including means for directing said first and said second detection beams between said first polarization sensitive beamsplitter and said measurement reflector along said first and second portions of said measurement path, a first reflector optically coupled between said second retroreflector and said measurement reflector and including means for directing said first and said second detection beams between said second retroreflector and said measurement reflector along said first and second portions of said measurement path, a second reflector optically coupled between said first reflector and said measurement reflector and including means for directing said first and said second detection beams between said first reflector and said measurement reflector along said first and second portions of said measurement path, and second polarization rotator means, located in said measurement path and optically coupled between said second reflector and said measurement reflector, for rotating said first and said second detection beams from having said first polarization to having said second polarization and from having said second polarization to having said first polarization.

40. An interferometric measuring system comprising:

a first laser source including means for projecting a reference light beam at first measurement wavelength along a reference path to a reference reflector, and means for projecting a measurement light beam at a second measurement wavelength along a measurement path to a measurement reflector;

means for determining a change in position of said measurement reflector from an interference pattern produced between a reflected reference beam from said reference reflector and a reflected measurement beam from said measurement reflector;

wherein said reference light beam has any of a first polarization and a second polarization, said reference path has a first portion and a second portion, said reference reflector includes means for rotating said reference light beam from having said first polarization to having said second polarization and for rotating said reference light beam from having said second polarization to having said first polarization, and wherein said means for projecting said reference light beam comprises;

a first polarization sensitive beamsplitter having means for directing said reference light beam from said first laser source along said first portion of said reference path in response to said reference light beam having said first polarization, and means for directing said reference light beam reflected from said reference reflector along said second portion of said reference path to said position measurement means, in response to said reflected reference light beam having said first polarization;

a second polarization sensitive beamsplitter having means for directing said reference light beam from said first polarization sensitive beamsplitter to said reference reflector along said first portion of said reference path in response to said reference light beam having said first polarization, means for directing said reference light beam reflected from said reference reflector along said second portion of said reference path to said first polarization sensitive beamsplitter in response to said reference light beam reflected from said reference reflector having said first polarization, and means for passing said reference light beam reflected from said reference reflector in response to said reference light beam reflected from said reference reflector having said second polarization;

first polarization rotator means, located in said first and second portions of said reference path between said second polarization sensitive beamsplitter and said reference reflector, for rotating said reference light beam from having said first polarization to having said second polarization and for rotating said reference light beam from having said second polarization to having said first polarization; and first retroreflector means for directing said reference light beam reflected from said reference reflector, having said second polarization and passed from said first polarization sensitive beamsplitter along said first portion of said reference path, back to said first polarization sensitive beamsplitter, along said second portion of said reference path.

41. A system according to claim 40, wherein said measurement light beam has any of said first polarization and said second polarization, said measurement path has a first portion and a second portion, said measurement reflector includes means for rotating said measurement light beam from having said first polarization to having said second polarization and for rotating said measurement light beam from having said second polarization to having said first polarization wherein, said first polarization sensitive beamsplitter further includes means for directing said measurement light beam from said first laser source along said first portion of said measurement path, in response to said measurement light beam having said second polarization, and means for directing said measurement light beam reflected from said measurement reflector along said second portion of said measurement path to said position measurement means in response to said reflected measurement light beam having said second polarization, wherein said means for projecting said measurement light beam further comprises, second retroreflector means for redirecting a light beam from said first portion of said measurement path to said second portion of said measurement path, a third polarization sensitive beamsplitter located in said first and second portions of said measurement path, and including means for directing said measurement light beam from said first polarization sensitive beamsplitter to said measurement reflector along said first portion of said measurement path, in response to said measurement light beam having said second polarization, means for directing said measurement light beam reflected from said measurement reflector along said first portion of said measurement path to said second retroreflector means in response to said measurement light beam reflected from said measurement reflector having said first polarization, means for directing said measurement light beam reflected from said measurement reflector and coupled from said second retroreflector means along said second portion of said measurement path back to said measurement reflector in response to said measurement light beam reflected from said measurement reflector having said first polarization, and means for directing said measurement light beam reflected from said measurement reflector along said second portion of said measurement path to said second polarization sensitive beamsplitter, in response to said measurement light beam reflected from said measurement reflector having said second polarization.

* * * * *